United States Patent
Yoshizumi et al.

(10) Patent No.: US 8,164,643 B2
(45) Date of Patent: Apr. 24, 2012

(54) COMPOSITION DETERMINING APPARATUS, COMPOSITION DETERMINING METHOD, AND PROGRAM

(75) Inventors: Shingo Yoshizumi, Tokyo (JP); Hiroki Yamawaki, Kanagawa (JP)

(73) Assignee: Sony Corporation (JP)

( * ) Notice: Subject to any disclaimer, the term of this patent is extended or adjusted under 35 U.S.C. 154(b) by 445 days.

(21) Appl. No.: 12/287,412

(22) Filed: Oct. 9, 2008

(65) Prior Publication Data

US 2009/0102942 A1   Apr. 23, 2009

(30) Foreign Application Priority Data

Oct. 17, 2007   (JP) ................ P2007-270392

(51) Int. Cl.
*H04N 5/228* (2006.01)

(52) U.S. Cl. ............. 348/222.1; 348/208.14; 348/169

(58) Field of Classification Search ............ 348/222.1, 348/169, 208.14
See application file for complete search history.

(56) References Cited

U.S. PATENT DOCUMENTS

| | | |
|---|---|---|
| 6,661,450 B2 | 12/2003 | Yata |
| 2002/0191860 A1 | 12/2002 | Cheatle |
| 2006/0158534 A1 | 7/2006 | Gotohda |
| 2007/0064278 A1 | 3/2007 | Sugimoto |
| 2007/0195995 A1 | 8/2007 | Matsumoto et al. |

FOREIGN PATENT DOCUMENTS

| | | | |
|---|---|---|---|
| CN | 1933539 A | | 3/2007 |
| EP | 1699013 A1 | | 9/2006 |
| JP | 59-208983 A | | 11/1984 |
| JP | 2000098456 A | | 4/2000 |
| JP | 2001167253 A | | 6/2001 |
| JP | 2001-268425 A | | 9/2001 |
| JP | 2007036584 A | * | 2/2007 |
| JP | 2009088710 A | | 4/2009 |
| WO | 2007072663 A1 | | 6/2007 |

OTHER PUBLICATIONS

Office Action from China Application No. 200810167942.3, dated Mar. 10, 2010.
European Search Report EP 08166659, dated Dec. 29, 2011.
"Trying out Sony Party-Shot Personal Photographer", Internet Citation, Nov. 22, 2009, XP 007914927.

* cited by examiner

*Primary Examiner* — Usman Khan
(74) *Attorney, Agent, or Firm* — Lerner, David, Littenberg, Krumholz & Mentlik, LLP

(57) ABSTRACT

A composition determining apparatus includes a subject detecting unit configured to detect existence of one or more specific subjects in an image based on image data; and a composition determining unit configured to determine a composition in accordance with the number of subjects detected by the subject detecting unit.

9 Claims, 23 Drawing Sheets

FIG. 8A
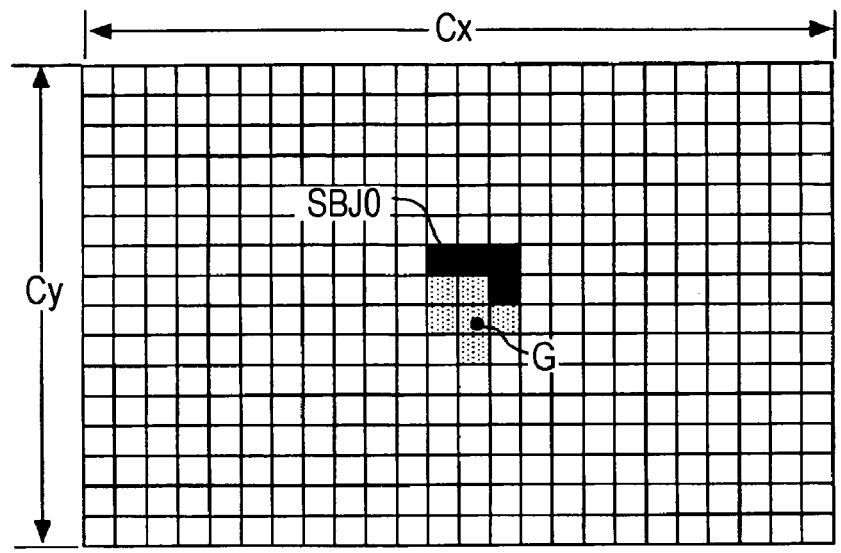
FIG. 8B
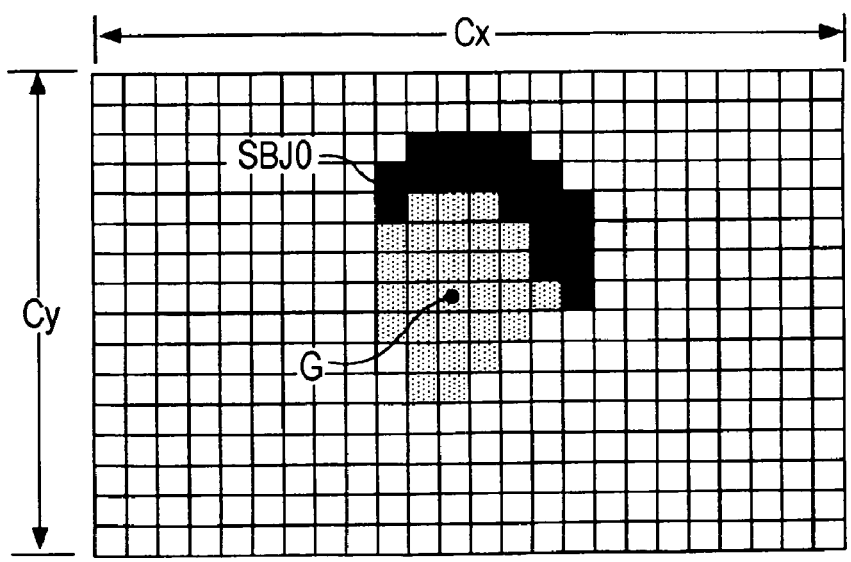

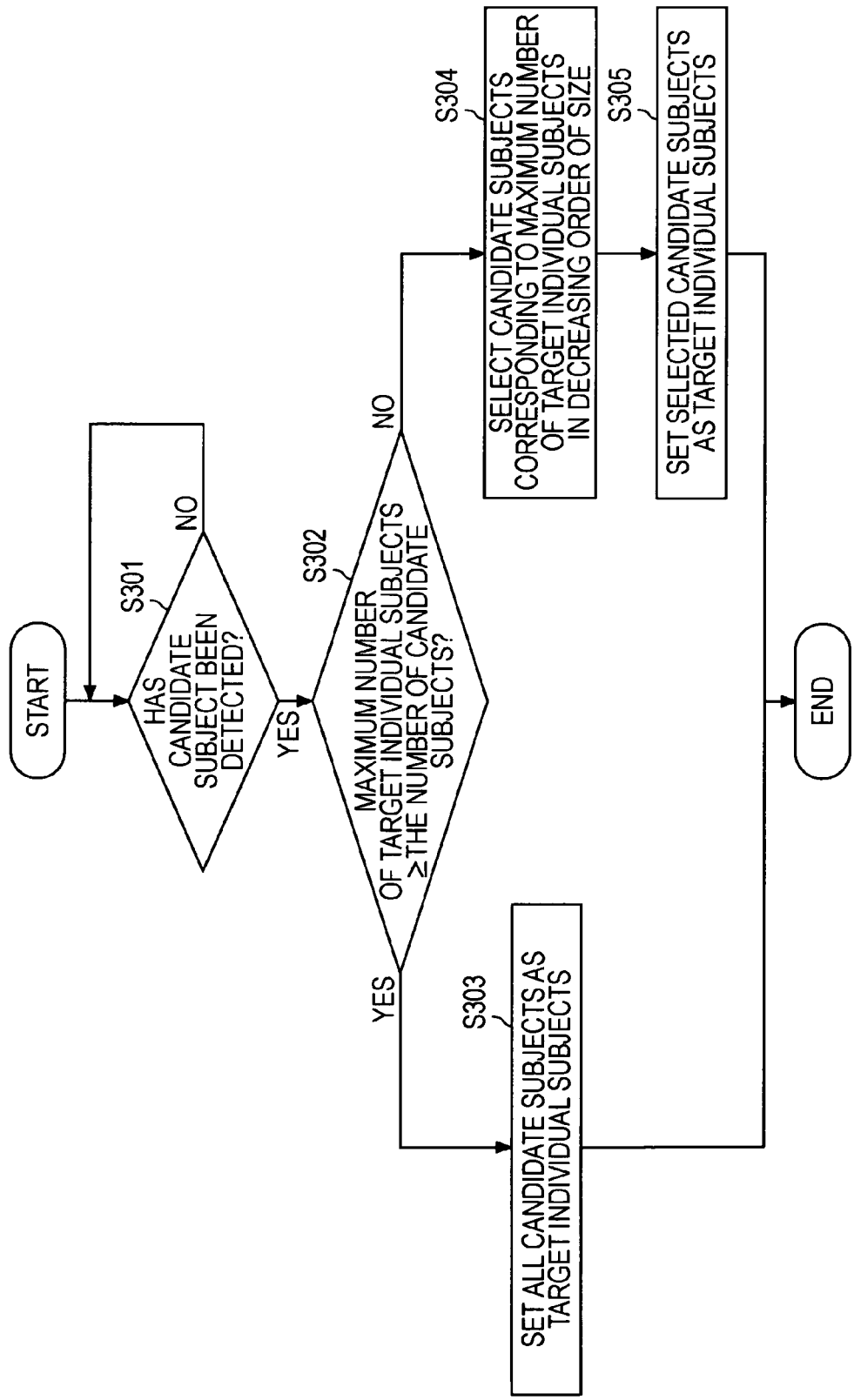

COMPOSITION DETERMINING APPARATUS, COMPOSITION DETERMINING METHOD, AND PROGRAM

CROSS REFERENCES TO RELATED APPLICATIONS

The present application claims priority from Japanese Patent Application JP No. 2007-270392 filed in the Japanese Patent Office on Oct. 17, 2007, the entire content of which is incorporated herein by reference.

BACKGROUND OF THE INVENTION

1. Field of the Invention

The present invention relates to a composition determining apparatus to determine a composition of image content of still image data or the like and to a composition determining method. Also, the present invention relates to a program executed by the apparatus.

2. Description of the Related Art

One of technical factors for taking a photo giving a good impression is composition setting. The term "composition" here is also called "framing" and is layout of a subject in an image as a photo or the like.

There are some typical and basic methods for obtaining a good composition. However, it is far from easy for an ordinary camera user to take a photo of a good composition unless he/she has sufficient knowledge and technique about photography. For this reason, a technical configuration enabling a user to readily and easily obtain a photo image of a good composition is demanded.

For example, Patent Document 1 (Japanese Unexamined Patent Application Publication No. 59-208983) discloses a technical configuration of an automatic tracking apparatus. In this technical configuration, a difference between images of a regular time interval is detected, a barycenter of the difference between the images is calculated, an imaging apparatus is controlled by detecting the amount and direction of movement of a subject image with respect to an imaging screen based on the amount and direction of movement of the barycenter, and the subject image is set in a reference area of the imaging screen.

Also, Patent Document 2 (Japanese Unexamined Patent Application Publication No. 2001-268425) discloses a technical configuration about an automatic tracking apparatus. In this technical configuration, a person is automatically tracked with the area of upper 20% of the entire person on a screen being at the center of the screen so that the face of the person is positioned at the center of the screen, whereby the person can be tracked while his/her face being reliably shot.

When those technical configurations are viewed from a viewpoint of deciding a composition, it is possible to automatically search for a subject as a person and place the subject in an imaging screen with a predetermined composition.

SUMMARY OF THE INVENTION

An optimum composition may vary depending on a predetermined status or condition of a subject. However, the techniques disclosed in the above-mentioned Patent Documents can only place a tracked subject with a certain fixed composition. In other words, it may be impossible to perform shooting by changing a composition in accordance with the status of a subject.

Accordingly, the present invention is directed to suggesting a technique for easily obtaining a good composition of an image as a photo or the like. Specifically, the present invention is directed to deciding a composition more appropriately and flexibly in accordance with a change in status and condition of a subject.

According to an embodiment of the present invention, there is provided a composition determining apparatus including subject detecting means for detecting existence of one or more specific subjects in an image based on image data; and composition determining means for determining a composition in accordance with the number of subjects detected by the subject detecting means.

In the above-described configuration, an optimum composition is determined based on the number of subjects detected in an image based on image data. For example, an optimum composition varies depending on the number of subjects existing in a screen. According to the embodiment of the present invention, an optimum composition can be obtained in accordance with change in condition, that is, change in the number of subjects.

According to the embodiment of the present invention, an optimum composition of image content of image data can be obtained in accordance with the number of subjects. That is, a composition is automatically decided more appropriately and flexibly compared to the case where a subject is simply placed based on a fixed composition. Accordingly, a user using an apparatus to which the embodiment of the present invention is applied can obtain an image of an optimum composition without a cumbersome operation, so that increased convenience can be provided.

BRIEF DESCRIPTION OF THE DRAWINGS

FIGS. 8A and 8B are diagrams schematically illustrating an example of first composition control in the case where the number of detected individual subjects is 1;

FIG. 16 illustrates a flowchart of an example of a process procedure for realizing the subject discrimination according to the embodiment;

DESCRIPTION OF THE PREFERRED EMBODIMENTS

Hereinafter, an embodiment of the present invention is described. Specifically, descriptions are given about a case where a configuration based on the embodiment of the present invention is applied to an imaging system including a digital still camera and a pan/tilt head to which the digital still camera is attached.

Figure 1:
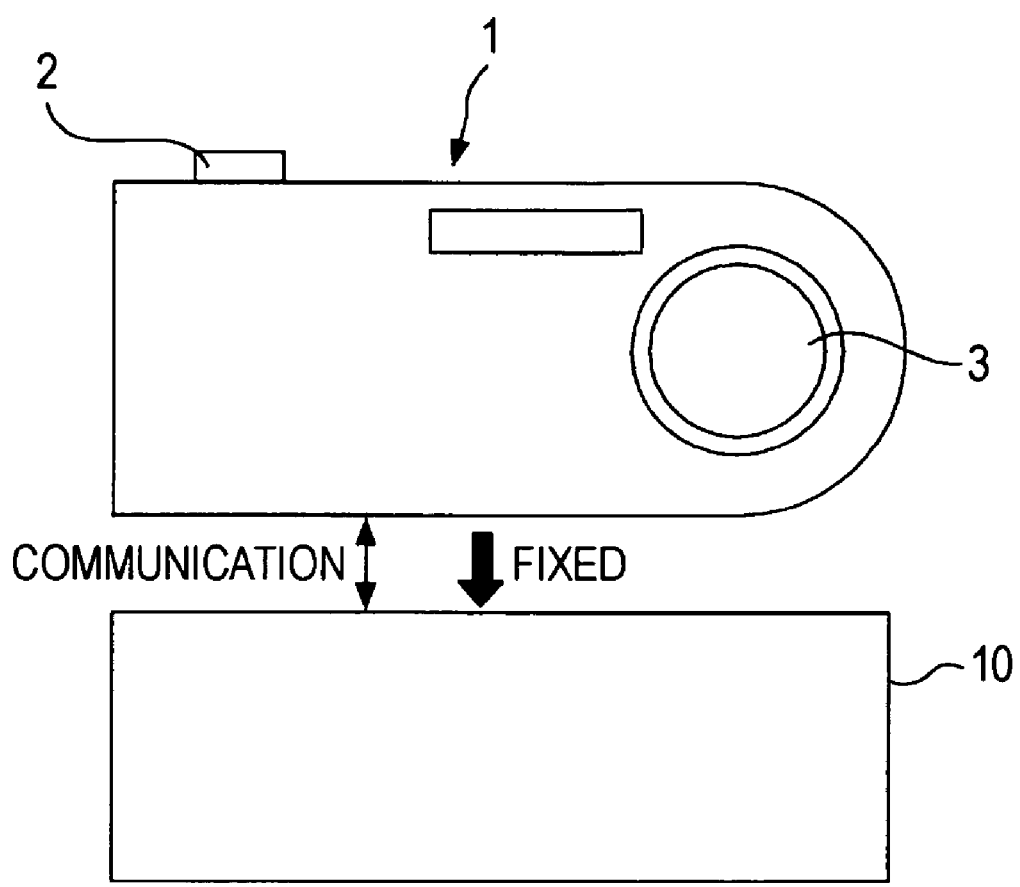
FIG. 1 is a diagram illustrating an example of an appearance configuration of an imaging system including a digital still camera and a pan/tilt head according to an embodiment of the present invention.

FIG. 1 is a front view illustrating an example of an appearance configuration of an imaging system according to the embodiment.

As illustrated in FIG. 1, the imaging system of the embodiment includes a digital still camera 1 and a pan/tilt head 10.

The digital still camera 1 is capable of generating still image data based on imaging light obtained through a lens unit 3 provided on a front-side panel of a main body and storing the still image data in a storage medium loaded therein. That is, the digital still camera 1 has a function of storing images captured as photos in a storage medium in the form of still image data. When such photography is manually performed, a user presses a shutter (release) button 2 provided on an upper surface of the main body.

The digital still camera 1 can be attached to the pan/tilt head 10 by fixing it. That is, the pan/tilt head 10 and the digital still camera 1 have a mechanism portion enabling mutual attachment.

The pan/tilt head 10 has a pan/tilt mechanism to move the digital still camera 1 attached thereto in both pan (horizontal) and tilt directions.

Figure 2A:
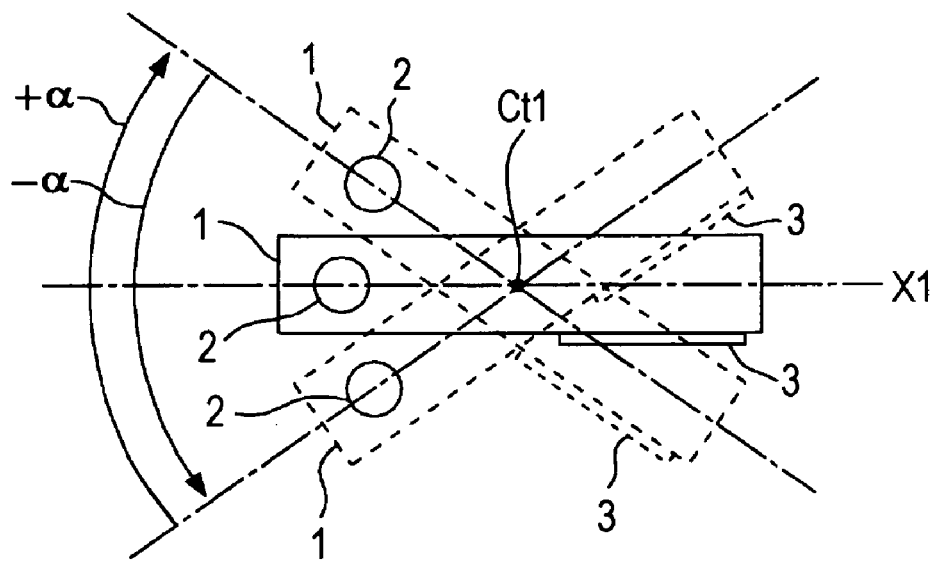
FIGS. 2A and 2B are diagrams schematically illustrating movements of the imaging system according to the embodiment, that is, an example of movements along pan and tilt directions of the digital still camera attached to the pan/tilt head.
Figure 2B:
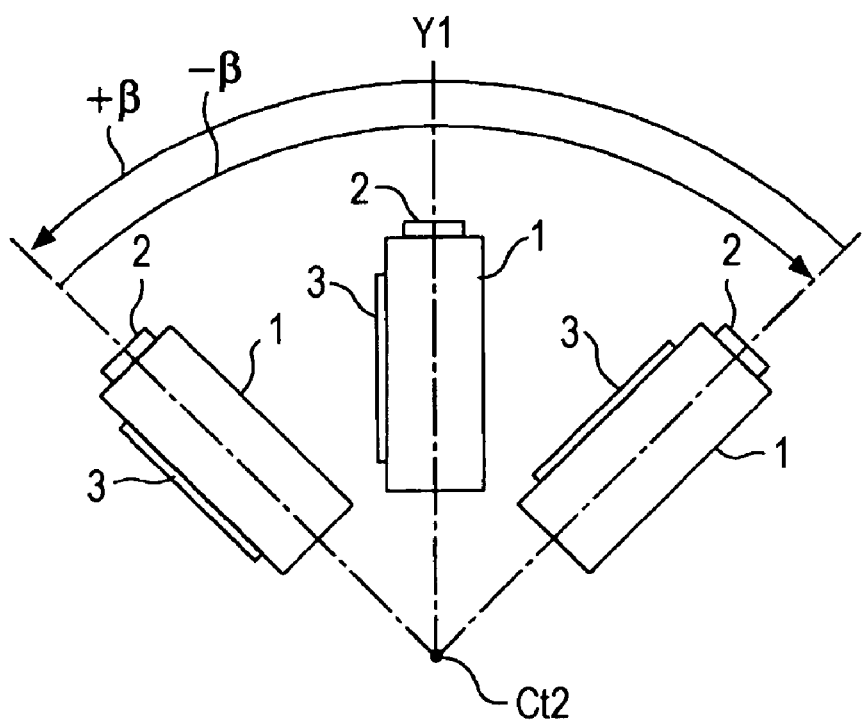

Examples of movement in the pan and tilt directions of the digital still camera 1 realized by the pan/tilt mechanism of the pan/tilt head 10 are illustrated in FIGS. 2A and 2B. FIGS. 2A and 2B illustrate the digital still camera 1 attached to the pan/tilt head 10 viewed in a planar direction and a side direction, respectively.

Regarding the pan direction, a positional state where the horizontal direction of the main body of the digital still camera 1 matches a straight line X1 in FIG. 2A is regarded as a reference state. For example, when rotation along a rotational direction $+\alpha$ around a rotational axis Ct1 is performed, a panning movement to the right is given. When rotation along a rotational direction $-\alpha$ is performed, a panning movement to the left is given.

On the other hand, regarding the tilt direction, a positional state where the vertical direction of the main body of the digital still camera 1 matches a straight line Y1 in FIG. 2B is regarded as a reference state. For example, when rotation along a rotational direction $+\beta$ around a rotational axis Ct2 is performed, a downward tiling movement is given. When rotation along a rotational direction $-\beta$ is performed, an upward tilting movement is given.

Maximum movable rotation angles in the respective $\pm\alpha$ and $\pm\beta$ directions illustrated in FIGS. 2A and 2B are not referred to. However, it is preferable that the maximum movable rotation angles are as large as possible so that a user can have more opportunities to catch subjects.

Figure 3:
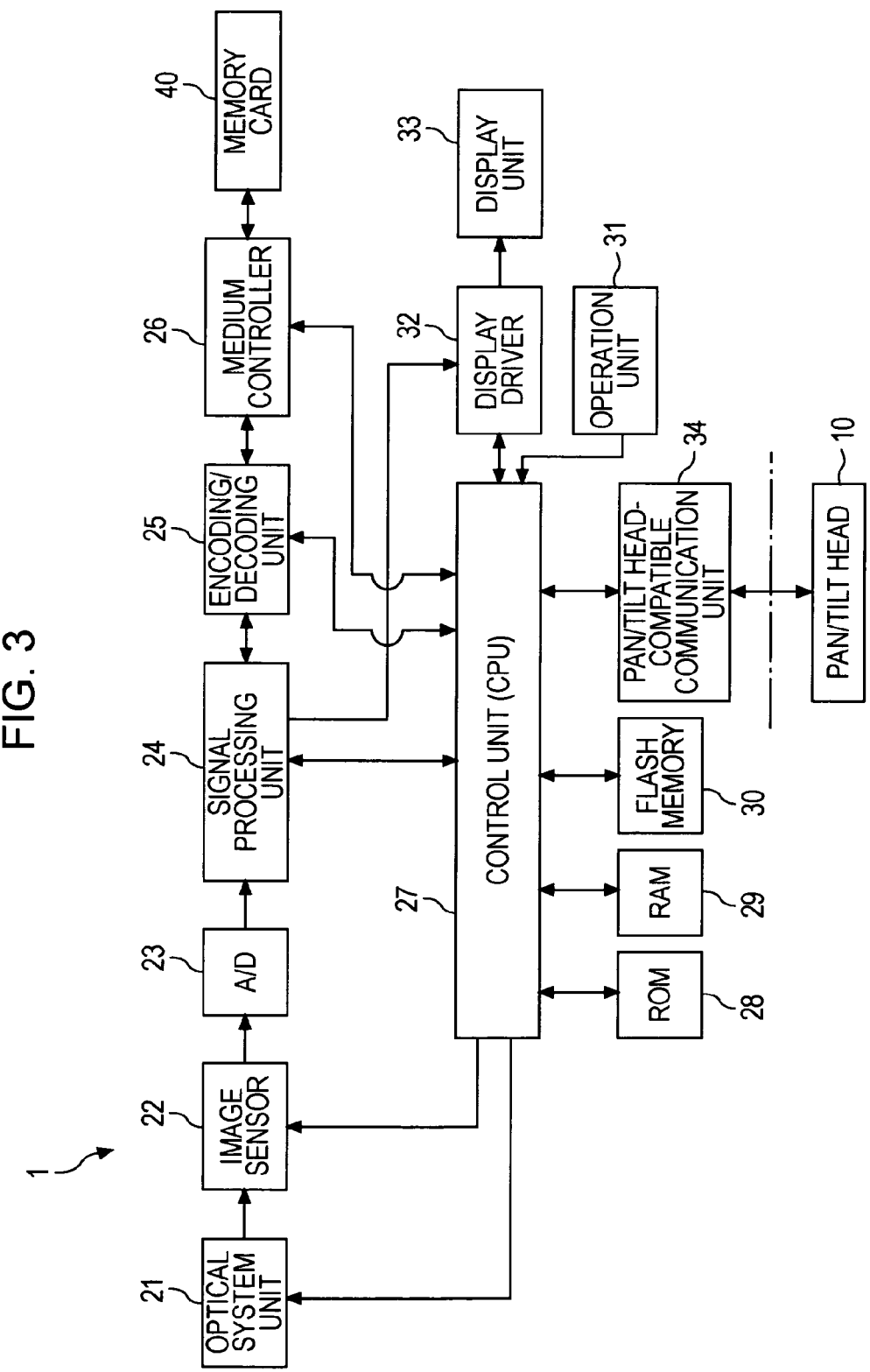
FIG. 3 is a diagram illustrating an example of a configuration of the digital still camera according to the embodiment.

FIG. 3 is a block diagram illustrating an example of an internal configuration of the digital still camera 1 according to the embodiment.

Referring to FIG. 3, an optical system unit 21 includes a group of a predetermined number of imaging lenses, such as a zoom lens and a focus lens; and an aperture. The optical system unit 21 forms an image on a light-receiving surface of an image sensor 22 based on incident light as imaging light.

Also, the optical system unit 21 includes driving mechanisms to drive the zoom lens, focus lens, aperture, and so on. The operations of those driving mechanisms are controlled by so-called camera control, such as zoom (angle of view) control, autofocus control, and autoexposure control, performed by a control unit 27, for example.

The image sensor 22 performs so-called photoelectric conversion of converting imaging light obtained in the optical system unit 21 to electric signals. For this purpose, the image sensor 22 receives, on the light-receiving surface of a photoelectric conversion device, imaging light from the optical system unit 21, and sequentially outputs signal charges accumulated in accordance with the intensity of the received light at predetermined timing. Accordingly, electric signals (imaging signals) corresponding to the imaging light are output. The photoelectric conversion device (imaging device) adopted as the image sensor 22 is not particularly limited. Under present circumstances, a CMOS (complementary metal-oxide semiconductor) sensor or a CCD (charge coupled device) can be used, for example. When the CMOS sensor is adopted, the configuration of a device (component) corresponding to the image sensor 22 may include an analog-digital converter corresponding to an A/D converter 23 described below.

The imaging signals output from the image sensor 22 are input to the A/D converter 23 and are converted to digital signals, and then the digital signals are input to a signal processing unit 24.

The signal processing unit 24 takes in the digital imaging signals output from the A/D converter 23 in units of still images (frame images), for example, and performs necessary signal processing on the imaging signals in units of still images, thereby generating captured image data (captured still image data), which is image signal data corresponding to one still image.

When the captured image data generated by the signal processing unit 24 in the above-described manner is to be stored as image information in a memory card 40 serving as a storage medium (storage medium device), the captured image data corresponding to one still image is output from the signal processing unit 24 to an encoding/decoding unit 25.

The encoding/decoding unit 25 performs compression coding in a predetermined still image compression coding method on the captured image data of the still image output from the signal processing unit 24 and adds a header or the like in accordance with control by the control unit 27, thereby converting the captured image data to captured image data compressed in a predetermined format. Then, the encoding/decoding unit 25 transfers the captured image data generated in this manner to a medium controller 26. The medium controller 26 writes the transferred captured image data on the memory card 40 in accordance with control by the control unit 27, so that the captured image data is stored in the memory card 40.

The memory card 40 adopted in this case is a storage medium that has an outer shape of a card compliant with a predetermined standard and that includes a nonvolatile semiconductor storage device, such as a flash memory. Instead of the memory card 40, another type and format of storage medium may be used to store image data.

The signal processing unit 24 according to the embodiment is capable of performing image processing to detect a subject by using the captured image data obtained in the above-described manner. Details of a subject detecting process in the embodiment are described below.

Also, the digital still camera 1 is capable of displaying a so-called through image, which is an image that is currently being captured, by allowing a display unit 33 to perform image display by using the captured image data obtained in the signal processing unit 24. Specifically, the signal processing unit 24 takes in imaging signals output from the A/D converter 23 and generates captured image data corresponding to one still image, as described above. By continuing this operation, the signal processing unit 24 sequentially generates captured image data corresponding to frame images in moving images. Then, the signal processing unit 24 transfers the sequentially generated captured image data to a display driver 32 in accordance with control by the control unit 27. Accordingly, through images are displayed.

The display driver 32 generates a drive signal to drive the display unit 33 based on the captured image data input from the signal processing unit 24 in the above-described manner and outputs the drive signal to the display unit 33. Accordingly, images based on the captured image data in units of still images are sequentially displayed in the display unit 33, whereby the user can view moving images that are being captured at the time in the display unit 33. That is, monitor images are displayed.

Also, the digital still camera 1 is capable of reproducing the captured image data recorded on the memory card 40 and displaying the images in the display unit 33.

For this purpose, the control unit 27 specifies captured image data and instructs the medium controller 26 to read the data from the memory card 40. In response to the instructions, the medium controller 26 accesses an address on the memory card 40 on which the specified captured image data is recorded and reads the data, and then transfers the read data to the encoding/decoding unit 25.

The encoding/decoding unit 25 extracts substantial data as compressed still image data from the captured image data transferred from the medium controller 26 in accordance with control by the control unit 27 and performs a decoding process corresponding to compression coding on the compressed still image data, thereby obtaining captured image data corresponding to one still image. Then, the encoding/decoding unit 25 transfers the captured image data to the display driver 32. Accordingly, the image of the captured image data recorded on the memory card 40 is reproduced and displayed in the display unit 33.

Together with the above-described monitor image and reproduced image of captured image data, a user interface image can be displayed in the display unit 33. In that case, the control unit 27 generates image data to be displayed as a necessary user interface image in accordance with the operation state at the time and outputs the generated image data to the display driver 32. Accordingly, the user interface image is displayed in the display unit 33. This user interface image can be displayed as a specific menu screen or the like on a display screen of the display unit 33 separately from the monitor image or the reproduced image of captured image data. Alternatively, the user interface image can be displayed while being superimposed on or combined into part of the monitor image or the reproduced image of captured image data.

The control unit 27 actually includes a CPU (central processing unit) and constitutes a microcomputer together with a ROM (read only memory) 28 and a RAM (random access memory) 29. The ROM 28 stores a program to be executed by the CPU as the control unit 27, various pieces of setting information related to the operation of the digital still camera 1, and so on. The RAM 29 serves as a main storage device for the CPU.

In this case, a flash memory 30 is provided as a nonvolatile storage area used to store various pieces of setting information that should be changed (rewritten) in accordance with a user operation or an operation history. When a nonvolatile memory, such as a flash memory, is adopted as the ROM 28, part of a storage area in the ROM 28 may be used instead of the flash memory 30.

An operation unit 31 includes various operation buttons provided in the digital still camera 1 and an operation information signal outputting unit to generate operation information signals corresponding to operations performed on those operation buttons and output the generated signals to the CPU. The control unit 27 performs a predetermined process in response to each of the operation information signals input from the operation unit 31. Accordingly, the digital still camera 1 is operated in accordance with a user operation.

A pan/tilt head-compatible communication unit 34 performs communication between the pan/tilt head 10 and the digital still camera 1 in accordance with a predetermined communication method, and has a physical layer configuration enabling wired or wireless transmission/reception of communication signals to/from a communication unit of the pan/tilt head 10 in a state where the digital still camera 1 is attached to the pan/tilt head 10; and a configuration to realize a communication process corresponding to a predetermined upper layer.

Figure 4:
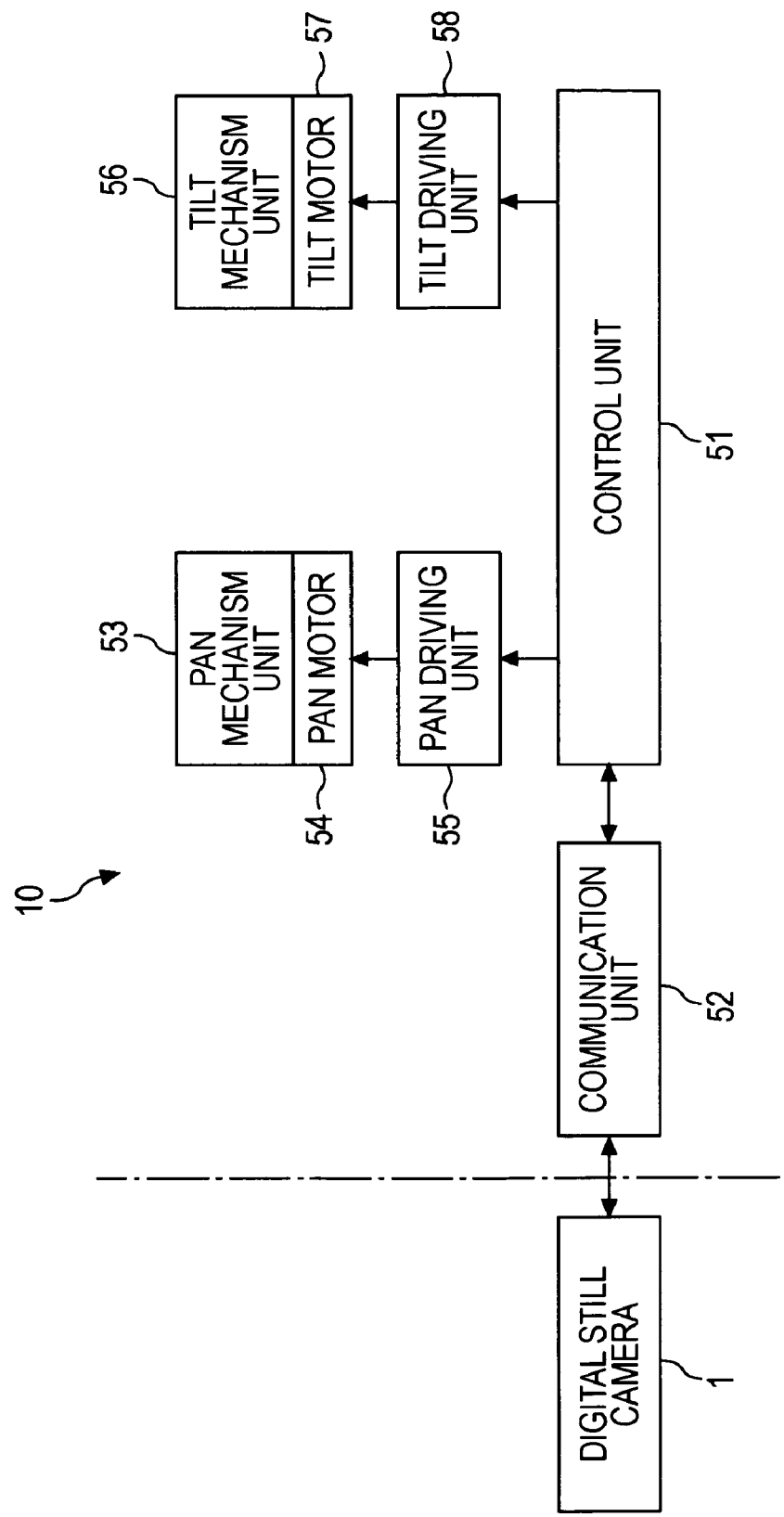
FIG. 4 is a diagram illustrating an example of a configuration of the pan/tilt head according to the embodiment.

FIG. 4 is a block diagram illustrating an example of a configuration of the pan/tilt head 10.

As described above, the pan/tilt head 10 includes a pan/tilt mechanism. As elements corresponding to this mechanism, the pan/tilt head 10 includes a pan mechanism unit 53, a pan motor 54, a tilt mechanism unit 56, and a tilt motor 57.

The pan mechanism unit 53 has a mechanism to give a movement in the pan (horizontal) direction illustrated in FIG. 2A to the digital still camera 1 attached to the pan/tilt head 10, and the movement of this mechanism can be obtained when the pan motor 54 rotates in a forward or reverse direction. Likewise, the tilt mechanism unit 56 has a mechanism to give a movement in the tilt (vertical) direction illustrated in FIG. 2B to the digital still camera 1 attached to the pan/tilt head 10, and the movement of this mechanism can be obtained when the tilt motor 57 rotates in a forward or reverse direction.

A control unit 51 includes a microcomputer formed by combining a CPU, a ROM, and a RAM, for example, and controls the movement of the pan mechanism unit 53 and the tilt mechanism unit 56. Specifically, when controlling the movement of the pan mechanism unit 53, the control unit 51 outputs a control signal corresponding to the amount and direction of movement necessary for the pan mechanism unit 53 to the pan driving unit 55. The pan driving unit 55 generates a motor driving signal corresponding to the input control signal and outputs the motor driving signal to the pan motor 54. The pan motor 54 is rotated by the motor driving signal in a necessary rotational direction and at a necessary rotation angle. As a result, the pan mechanism unit 53 is driven to move by the corresponding movement amount in the corresponding movement direction.

Likewise, when controlling the movement of the tilt mechanism unit 56, the control unit 51 outputs a control signal corresponding to the amount and direction of movement necessary for the tilt mechanism unit 56 to the tilt driving unit 58. The tilt driving unit 58 generates a motor driving signal corresponding to the input control signal and outputs the motor driving signal to the tilt motor 57. The tilt motor 57 is rotated by the motor driving signal in a necessary rotational direction and at a necessary rotation angle. As a result, the tilt mechanism unit 56 is driven to move by the corresponding movement amount in the corresponding movement direction.

A communication unit 52 communicates with the pan/tilt head-compatible communication unit 34 in the digital still camera 1 attached to the pan/tilt head 10 in accordance with a predetermined communication method. As the pan/tilt head-compatible communication unit 34, the communication unit 52 includes a physical layer configuration enabling wired or wireless transmission/reception of communication signals to/from the communication unit on the other side; and a configuration to realize a communication process corresponding to a predetermined upper layer.

In the imaging system including the digital still camera 1 and the pan/tilt head 10 having the above-described configuration, if a person is regarded as a main subject (hereinafter referred to simply as a subject) and if the existence of the subject is detected after search to detect the subject, the pan/tilt mechanism of the pan/tilt head 10 is driven to obtain an optimum composition of an image including the subject (to perform optimum framing). Then, at the timing when the optimum composition is obtained, the image data captured at the time is recorded on the storage medium (memory card 40).

That is, in the imaging system according to the embodiment, an operation of deciding (determining) an optimum composition for a found subject and performing shooting and recording is automatically performed during photography by the digital still camera 1. In this way, a photo image of a moderately good quality can be obtained without necessity of composition determination and shooting by a user. Furthermore, in such a system, shooting can be performed without someone's holding the camera, and thus everyone in the shooting site can become a subject. In addition, even if a user as a subject does not consciously enter a view-angle range of the camera, the subject can be taken in a photo. That is, opportunities to shoot a natural appearance of people existing in a shooting site increase, and thus many photos having an unprecedented atmosphere can be obtained.

An optimum composition may vary depending on the number of subjects. However, in composition decision according to the embodiment, different optimum compositions can be determined based on the number of detected subjects. Accordingly, compared to the case where a composition is decided without considering the number of subjects, an image of better quality can be obtained in the embodiment in a comprehensive point of view.

Hereinafter, composition control according to the embodiment is described.

Figure 5:
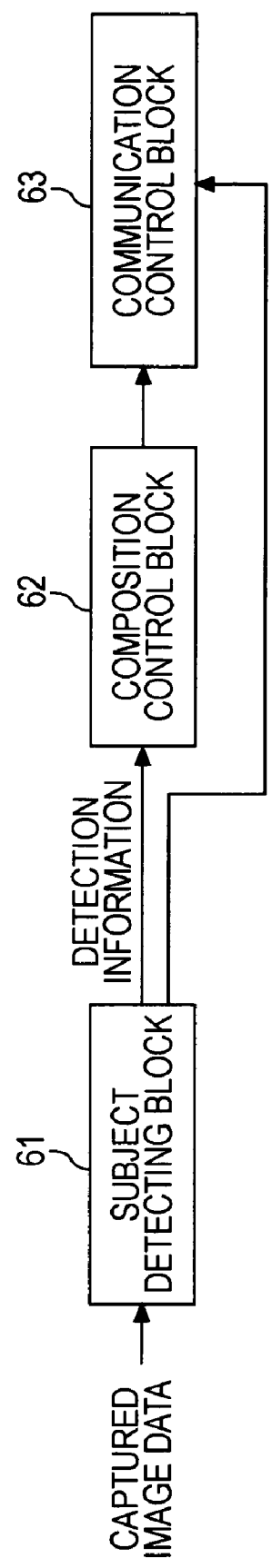
FIG. 5 is a diagram illustrating functions in units of blocks corresponding to composition control provided in the digital still camera according to the embodiment.

FIG. 5 illustrates an example of a configuration of a functional unit corresponding to composition control according to the embodiment, provided in the digital still camera 1.

Referring to FIG. 5, a subject detecting block 61 performs a subject detecting process including search control of a subject by using captured image data obtained in the signal processing unit 24 based on imaging signals obtained in the image sensor 22. Here, the subject detecting process means a process of discriminating and detecting a subject as a person in the image content of captured image data. The information obtained as a detection result (detection information) includes the number of subjects as people, the positional information of each individual subject in a screen, and the size (occupancy area) of each individual subject in an image. Depending on the structure of a composition determining algorithm, composition control according to the embodiment can be realized by obtaining only the number of subjects as detection information.

As a specific method of the subject detecting process, a technique of face detection can be used. Also, some methods of face detection are used in related arts, but the method to be adopted in the embodiment is not particularly limited, and an appropriate method may be adopted in view of detection accuracy and the degree of difficulty in design.

The subject detecting process performed by the subject detecting block 61 can be realized as the image signal processing in the signal processing unit 24. In the case where the signal processing unit 24 is constituted by a DSP (digital signal processor) as described above, the subject detecting process is realized by the program and instructions given to the DSP as the signal processing unit 24.

During subject search control, a control signal to drive the above-described pan/tilt mechanism is output via a communication control block 63 in order to control the pan/tilt mechanism of the pan/tilt head 10.

The detection information which is a result of the subject detecting process generated by the subject detecting block 61 is input to a composition control block 62.

The composition control block 62 decides a composition regarded as optimum (optimum composition) by using the detection information about the subject input thereto. Then, the composition control block 62 performs control to obtain the decided optimum composition (composition control). The composition control in this case includes control of changing an angle of view (in the embodiment, it means a field of view changeable in accordance with control of a zoom lens), control of a shooting direction along a pan (right or left) direction (pan control), and control of a shooting direction along a tilt (upward or downward) direction (tilt control). In order to change the angle of view, at least any one of zoom control of moving the zoom lens in the optical system unit 21 of the digital still camera 1; and image signal processing of clipping an image on the captured image data is performed. The pan control and tilt control are performed by controlling and moving the pan/tilt mechanism of the pan/tilt head 10. When control of the pan/tilt mechanism is performed, the composition control block 62 allows a control signal to set the pan/tilt mechanism at a desired position to be transmitted to the pan/tilt head 10 via the communication control block 63.

The process of deciding and controlling a composition performed by the above-described composition control block 62 can be performed by the control unit 27 (CPU) based on a program. Alternatively, the process performed by the signal processing unit 24 based on a program may be used together. The communication control block 63 performs a communication process with the communication unit 52 of the pan/tilt head 10 in accordance with a predetermined protocol, and serves as a functional unit corresponding to the pan/tilt head-compatible communication unit 34.

Next, an example of the subject detecting process performed by the subject detecting block 61 is described with reference to FIGS. 6A and 6B.

Figure 6A:
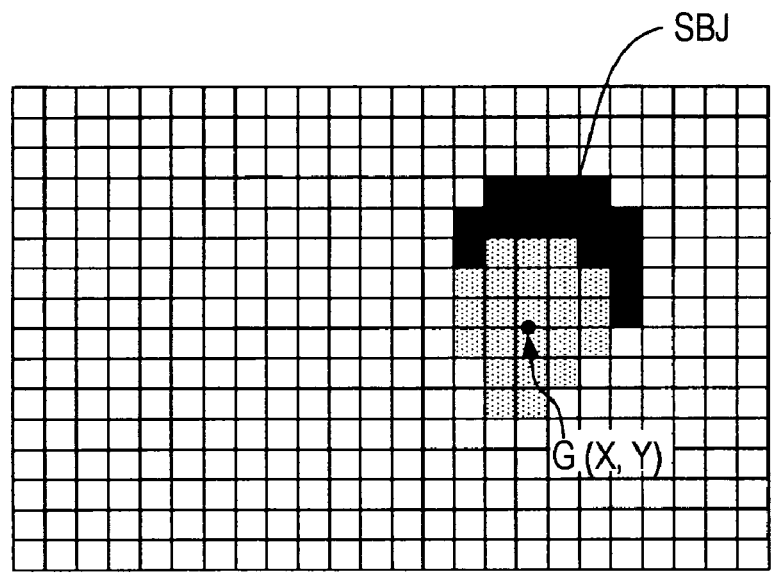
FIGS. 6A and 6B are diagrams illustrating a barycenter of an individual subject and a barycenter of a synthetic subject composed of a plurality of individual subjects.

Assume that the subject detecting block 61 has taken in captured image data having the image content illustrated in FIG. 6A. The image content of the captured image data is obtained by capturing an image in which a subject as a person exists. FIG. 6A (and FIG. 6B) illustrates a state where a screen is divided in a matrix pattern. This schematically illustrates that the screen as captured image data is composed of a set of a predetermined number of horizontal and vertical pixels.

By performing subject detection (face detection) on the captured image data having the image content illustrated in FIG. 6A, the face of an individual subject SBJ illustrated in the figure is detected. That is, detection of a face through a face detecting process is equivalent to detection of an individual subject. As a result of the detection of an individual subject, information of the number, position, and size of the individual subject is obtained, as described above.

Regarding the number of individual subjects, the number of faces detected through face detection may be obtained. In the case illustrated in FIG. 6A, the number of detected faces is 1, and thus the number of individual subjects is 1.

Figure 7:
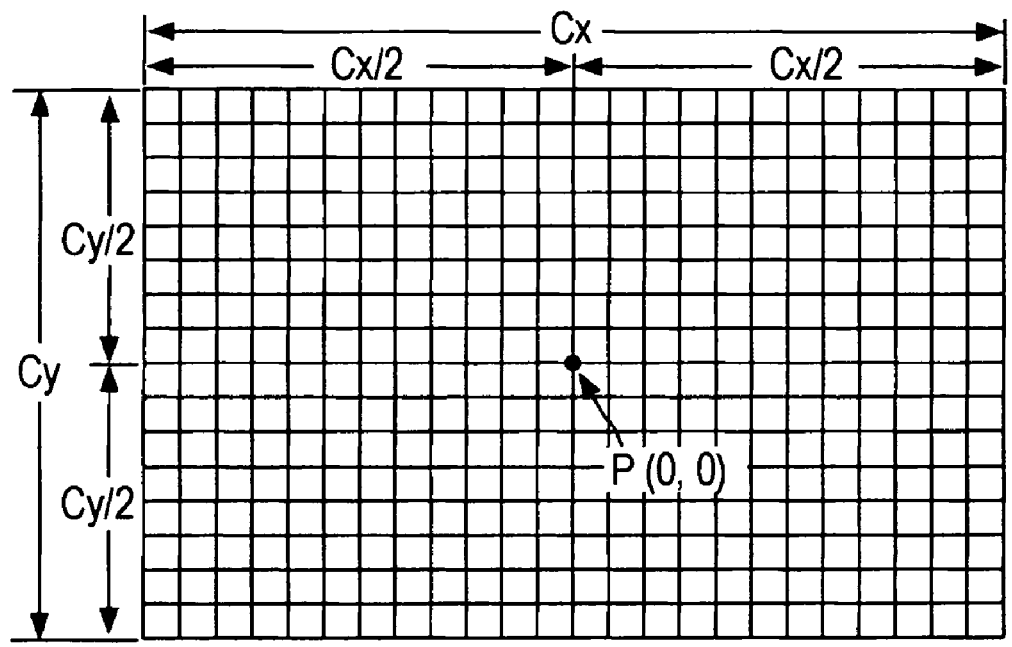
FIG. 7 is a diagram illustrating origin coordinates set on a screen of captured image data.

As the positional information of each individual subject, at least a barycenter G (X, Y) of the individual subject SBJ in the image as the captured image data is obtained. In this case, X and Y origin coordinates P (0, 0) on the screen of the captured image data as a reference of the barycenter G (X, Y) is the intersection of a middle point of a width (horizontal image size) Cx in the X-axis direction (horizontal direction) corresponding to the screen size and a middle point of a width (vertical image size) Cy in the Y-axis direction (vertical direction), as illustrated in FIG. 7.

A method for detecting the barycenter of a subject according to a related art can be adopted to define the position of the barycenter G of an individual subject in an image or to set the barycenter G.

The size of each individual subject can be obtained by calculating the number of pixels in an area specified and detected as a face portion by a face detecting process or the like.

Figure 6B:
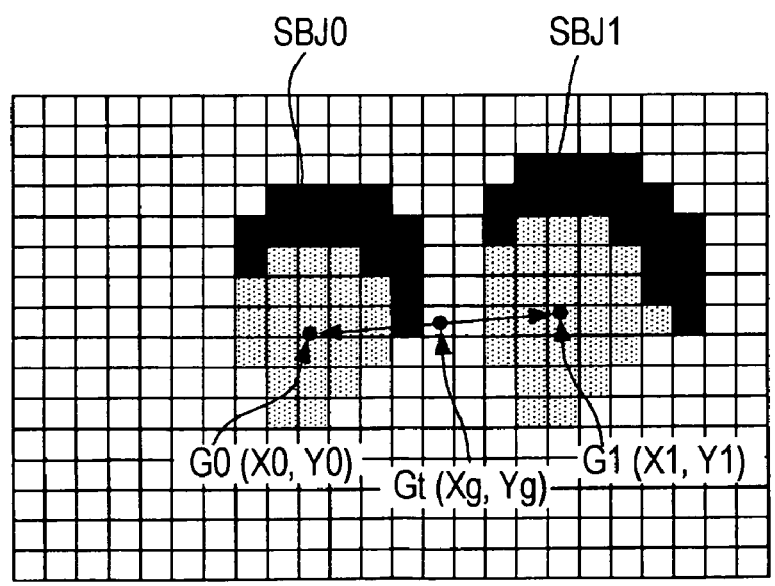

On the other hand, if the captured image data illustrated in FIG. 6B is taken in and if the subject detecting block 61 performs a subject detecting process, the existence of two faces is detected through face detection, so that a result indicating that the number of individual subjects is 2 can be obtained. Here, the two individual subjects are discriminated from each other: the left one is an individual subject SBJ0; and the right one is an individual subject SBJ1. The coordinates of the barycenter G of the individual subjects SBJ0 and SBJ1 are G0 (X0, Y0) and G1 (X1, Y1), respectively.

In the case where two or more individual subjects are detected in this way, the barycenter of a synthetic subject composed of the plurality of individual subjects, that is, the barycenter Gt (Xg, Yg) of the synthetic subject, is calculated.

There are some ways to set the barycenter Gt of the synthetic subject. In this case, the easiest way is adopted: the middle point of a line connecting the barycenters of the leftmost and rightmost individual subjects on the screen among the plurality of detected individual subjects is set as the barycenter Gt of the synthetic subject. The barycenter Gt of the synthetic subject is information that can be used in composition control, as described below, and is information that can be obtained through calculation after information of barycenters of individual subjects has been obtained. Therefore, the barycenter Gt of the synthetic subject may be obtained by the subject detecting block 61 and output as detection information. Alternatively, the barycenter Gt of the synthetic subject may be obtained by the composition control block 62 by using information about the barycenters of the rightmost and leftmost individual subjects in information indicating the positions of the barycenters of the individual subjects obtained as detection information.

Other than the above-described methods, the following setting method may also be used. That is, a weighting coefficient is assigned in accordance with the sizes of a plurality of individual subjects, and an arrangement is made by using the weighting coefficient so that the position of the barycenter Gt of the synthetic subject is close to one of the individual subjects having a large size.

The size of each of the individual subjects SBJ0 and SBJ1 can be obtained by calculating the number of pixels occupied by a detected face of the subject.

Next, a composition that can be obtained by composition control as a first example of the embodiment is described with reference to FIGS. 8A to 10B.

FIG. 8A illustrates the case where image content including an individual subject SBJ0 has been obtained as captured image data as a result of subject detection before composition control. In the embodiment, when the pan/tilt head 10 to which the digital still camera 1 is attached is normally set, the orientation of the digital still camera 1 is set so that a horizontally-oriented image is captured. Thus, the first example is based on the assumption that a horizontally-oriented image is obtained by imaging.

In the case where one individual subject has been detected as illustrated in FIG. 8A, zoom control to decrease the angle of view is performed so that the occupancy of this individual subject SBJ0 in the screen of captured image data has a predetermined value, whereby the size of the individual subject is changed, as indicated by transition from FIG. 8A to FIG. 8B. FIGS. 8A and 8B illustrate the case where the angle of view is decreased to increase the size of the individual subject SBJ0. However, if the occupancy of an individual subject in the screen is over the above-described predetermined value in the stage where the individual subject has been detected, zoom control to increase the angle of view is performed so that the occupancy decreases to the predetermined value.

When the number of individual subjects is 1, the individual subject is positioned at almost the center of the screen in the horizontal direction in the embodiment. For this purpose, the position in the horizontal direction of a barycenter G of the individual subject SBJ0 is positioned at almost the center of the screen.

Figure 9A:
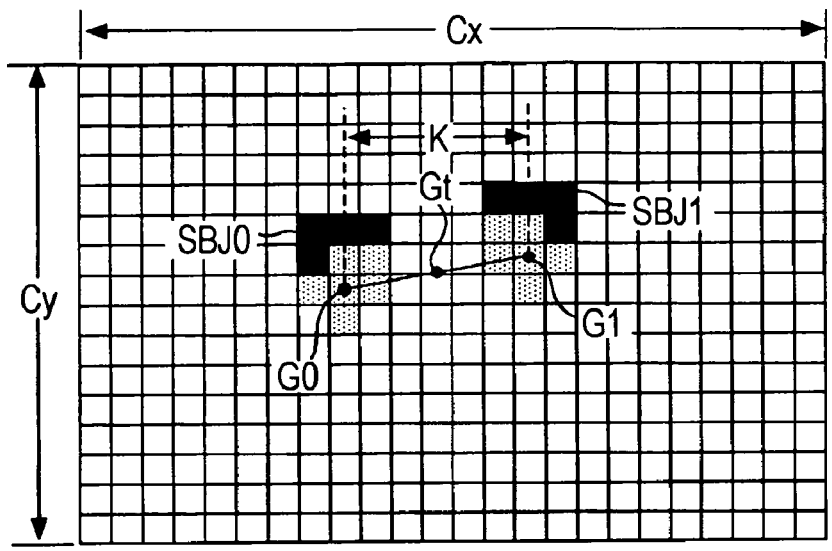
FIGS. 9A and 9B are diagrams schematically illustrating an example of the first composition control in the case where the number of detected individual subjects is 2.
Figure 9B:
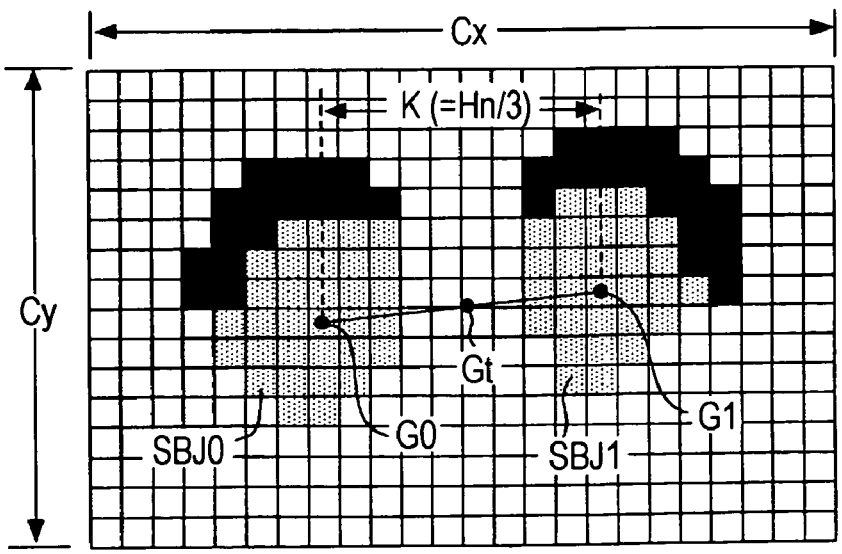

Then, as illustrated in FIG. 9A, in the case where two individual subjects have been detected, a distance K between the two individual subjects SBJ0 and SBJ1 (subject-to-subject distance) is first calculated as composition control. The distance K can be represented by, for example, the difference (X1−X0) between the X coordinate (X0) of the barycenter G0 of the individual subject SBJ0 and the X coordinate (X1) of the barycenter G1 of the individual subject SBJ1. Then, the angle of view is adjusted so that the subject-to-subject distance K calculated in the above-described manner is one third of a horizontal image size Cx (K=Cx/3), as illustrated in FIG. 9B. In this case, too, the area of the two individual subjects SBJ0 and SBJ1 is placed at almost the center in the horizontal direction of the screen. For this purpose, the barycenter Gt of a synthetic subject composed of the individual subjects SBJ0 and SBJ1 is placed at the center in the horizontal direction.

Incidentally, setting of the subject-to-subject distance K to one third of Cx is based on a composition setting method, called "the rule of thirds". The rule of thirds is one of the most basic composition setting methods. In this method, a subject is positioned on any of virtual lines dividing a rectangular screen into three segments in the vertical and horizontal directions, respectively, so as to obtain a good composition. By setting the subject-to-subject distance K to Cx/3 and positioning the barycenter Gt of the synthetic subject Gt at the center in the horizontal direction, as described above, the barycenter G0 of the individual subject SBJ0 is substantially positioned on a left virtual line along the vertical direction of the screen, whereas the barycenter G1 of the individual subject SBJ1 is substantially positioned on a right virtual line along the vertical direction of the screen. That is, a composition based on the rule of thirds can be obtained.

Figure 10A:
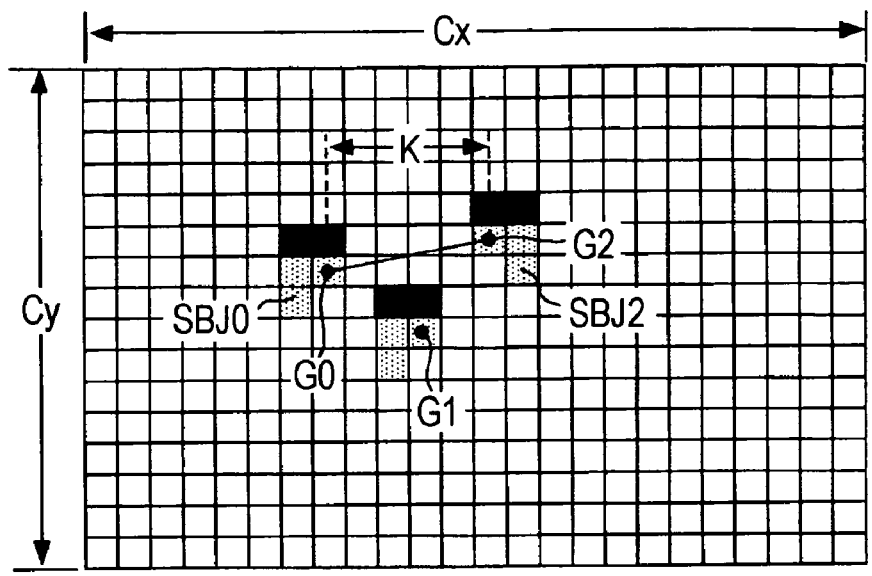
FIGS. 10A and 10B are diagrams schematically illustrating an example of the first composition control in the case where the number of detected individual subjects is 3 or more.

Also, in the case where three individual subjects have been detected as illustrated in FIG. 10A, a subject-to-subject distance K between the leftmost individual subject SBJ0 and the rightmost subject SBJ2 in the screen is calculated as composition control. Specifically, the subject-to-subject distance K is calculated in the following way. That is, in the case where the number of detected individual subjects is "n", numbers of 0 to n−1 are assigned to the individual subjects from left to right of the screen. The X coordinate of the barycenter G0 of the leftmost individual subject SBJ0 in the screen is represented by (X0), and the X coordinate of the barycenter Gn−1 of the rightmost individual subject SBJ(n−1) is represented by (Xn−1). Then, the distance K can be calculated by using a general expression (Xn−1)−(X0).

Figure 10B:
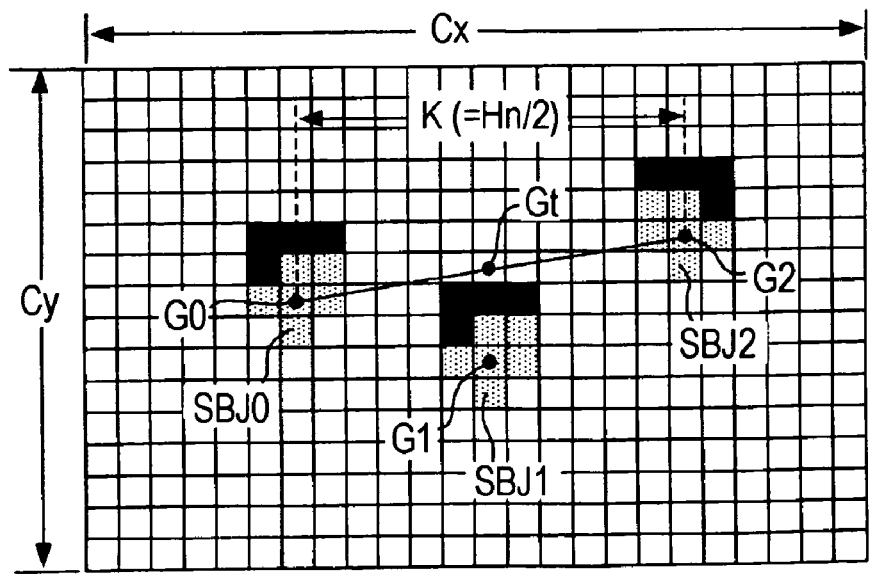

In this case, the angle of view is controlled so that the subject-to-subject distance K is half of the horizontal image size Cx, as illustrated in FIG. 10B. As for the subject position in the horizontal direction, the barycenter Gt of the synthetic subject is positioned at almost the center of the screen in the horizontal direction so that an area portion including the three individual subjects is positioned at almost the center of the screen in the horizontal direction. According to the embodiment, the composition control illustrated in FIGS. 10A and 10B is performed if three or more individual subjects are detected.

In the case where three or more individual subjects exist in the screen, a better composition can be typically obtained when the ratio of the subject-to-subject distance K to the horizontal image size Cx is high, compared to the case where the subject-to-subject distance K is set to one third of the horizontal image size Cx in faithful conformity with the rule of thirds. Thus, in the embodiment, if three or more individual subjects are detected as in the above-described case, a composition in which the subject-to-subject distance K is set to Cx/2 is formed.

As described above, in the composition control according to the embodiment, different adjustment of the angle of view is performed in the respective cases where the number of detected individual subjects is 1, 2, and 3.

Figure 11:
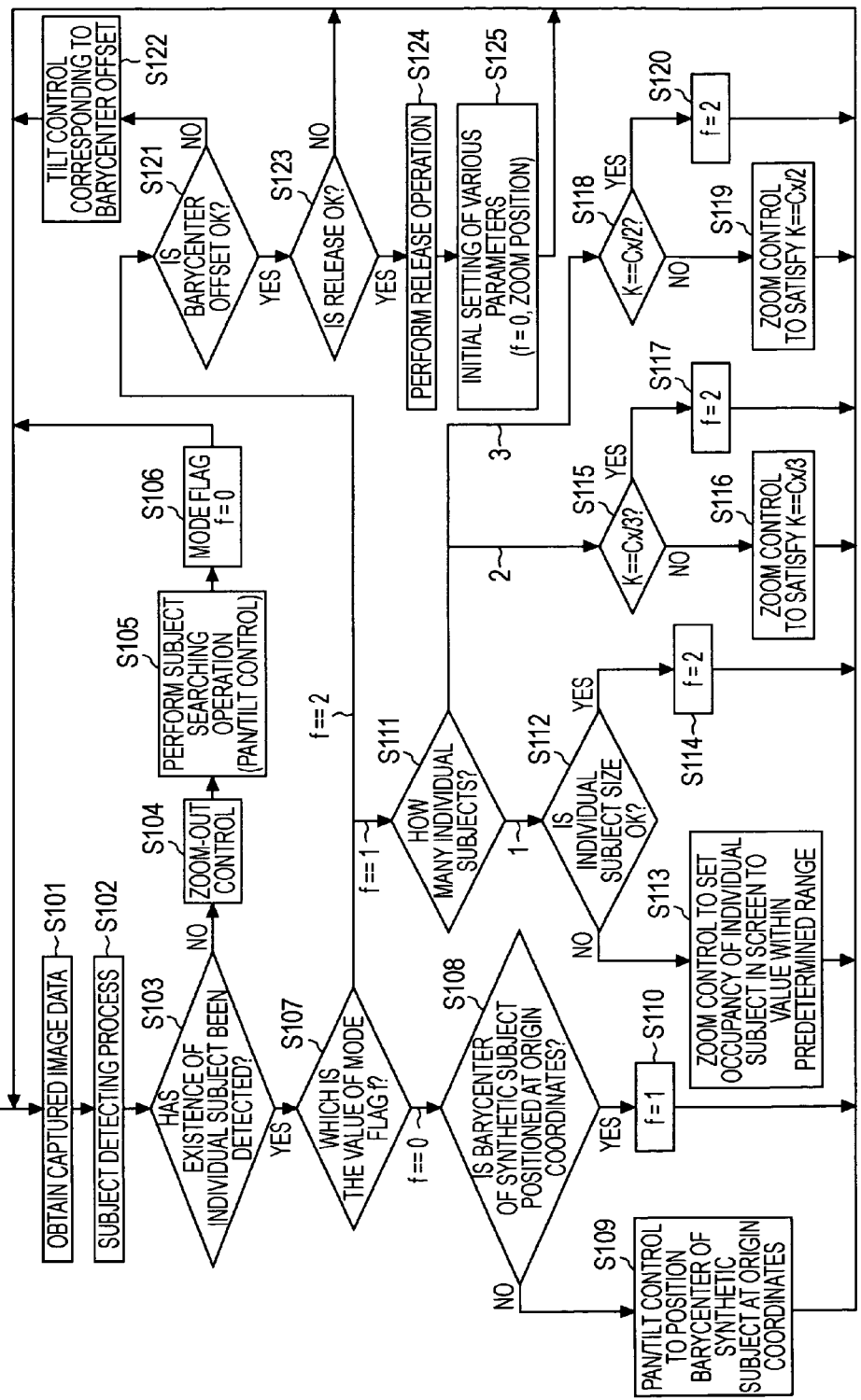
FIG. 11 illustrates a flowchart of an example of a process procedure for the first composition control.

FIG. 11 illustrates an example of a procedure of the first example of composition control described above with reference to FIGS. 8A to 10B performed by the subject detecting block 61, the composition control block 62, and the communication control block 63 illustrated in FIG. 5. The process illustrated in FIG. 11 is realized when the signal processing unit 24 as a DSP and the CPU in the control unit 27 perform a program. Such a program is written and stored in a ROM or the like during manufacture. Alternatively, the program may be stored in a removable storage medium and then installed (including update) from the storage medium so as to be stored in a nonvolatile storage area compatible with the DSP or the flash memory 30. Also, the program may be installed via a data interface, such as a USB or IEEE 1394, under control by another host apparatus. Furthermore, the program may be stored in a storage device in a server or the like on a network and obtained by downloading it from the server while allowing the digital still camera 1 to have a network function.

Steps S101 to S106 correspond to a procedure to search for and detect a subject and are mainly performed by the subject detecting block 61.

In step S101, captured image data based on imaging signals from the image sensor 22 is taken in and obtained. In step S102, a subject detecting process is performed by using the captured image data obtained in step S101. In the subject detecting process, it is determined whether an individual subject exists in image content as the captured image data by using the above-described method of face detection or the like. If an individual subject exists, at least the number of individual subjects, and the position (barycenter) and size of each individual subject are obtained as detection information.

In step S103, it is determined whether the existence of an individual subject has been detected as a result of the subject detecting process in step S102. If a negative determination result is obtained, that is, if the existence of an individual subject has not been detected (the number of detected individual subjects is 0), the process proceeds to step S104, where zoom lens movement control of increasing the angle of view (zoom-out control) is performed. By increasing the angle of view, an image of a wider range can be captured and thus an individual subject can be easily caught accordingly. At the same time, control to move the pan/tilt mechanism of the pan/tilt head 10 (pan/tilt control) is performed to search for a subject in step S105. At this time, the control is performed such that the subject detecting block 61 supplies a control signal for the pan/tilt control to the communication control block 63 and that the control signal is transmitted to the communication unit 52 of the pan/tilt head 10.

The pattern of moving the pan/tilt mechanism of the pan/tilt head 10 in the pan/tilt control to search for a subject may be decided so that the search is efficiently performed.

In step S106, a mode flag "f" is set to 0 (f=0) and the process returns to step S101.

In this way, the procedure of steps S101 to S106 is repeated until at least one individual subject is detected in the image content of captured image data. At this time, the system including the digital still camera 1 and the pan/tilt head 10 is in a state where the digital still camera 1 is moved in pan and tilt directions to search for a subject.

If a positive determination result is obtained in step S103, that is, if the existence of an individual subject has been detected, the process proceeds to step S107. The procedure from step S107 is mainly performed by the composition control block 62.

In step S107, the value currently set in the mode flag "f" is determined.

If it is determined that f==0, the value indicates that an initial rough subject catching mode should be performed as composition control, and thus the procedure starting from step S108 is performed as illustrated in FIG. 11.

In step S108, it is determined whether the barycenter Gt of a synthetic subject is positioned at the origin coordinates P (0, 0) (see FIG. 7) on the screen of the captured image data (the screen obtained by displaying the image content of the captured image data). If a negative determination result is obtained, that is, if the barycenter Gt of the synthetic subject has not been positioned at the origin coordinates, the process proceeds to step S109, where control to move the pan/tilt mechanism of the pan/tilt head 10 is performed so that the barycenter Gt of the synthetic subject is positioned at the origin coordinates, and then the process returns to step S101. As described above, in the catching mode which is the first procedure of composition control in a state where the existence of an individual subject has been detected, the pan/tilt mechanism of the pan/tilt head 10 is controlled so that the barycenter Gt of a synthetic subject is positioned at the origin coordinates as an initial reference position, whereby the image area including the detected individual subject is positioned at the center of the screen.

Now, an example of an algorithm for actually performing the pan/tilt control in step S109 is described.

In a state where an individual subject is detected with the mode flag f==0, the subject detecting block 61 performs calculation in accordance with the following expression (1) so as to obtain a necessary movement amount Span in a pan direction and a necessary movement amount Stilt in a tilt direction. In the following expression (1), "n" indicates the number of detected individual subjects, and "p (Xi, Yi)" indicates the X and Y coordinates of the barycenter of an i-th individual subject among the individual subjects to which numbers of 0 to n−1 are assigned. For confirmation, the origin coordinates (0, 0) in this case are at the intersection of the middle point in the horizontal direction and the middle point in the vertical direction in the screen, as illustrated in FIG. 7.

$$(S_{pan}, S_{tilt}) = \frac{\sum_{i=0}^{n-1} p(x_i, y_i)}{n} \quad (1)$$

For example, in step S108, whether the barycenter Gt of the synthetic subject is at the origin coordinates P can be determined by determining whether the absolute values of the necessary movement amounts Span and Stilt calculated in the above-described manner are within a predetermined range (strictly 0, but the value may be larger than 0). Then, in step S109, pan/tilt control is performed so that the absolute values of the necessary movement amounts Span and Stilt are within the predetermined range. At this time, the velocity of the pan mechanism unit 53 and the tilt mechanism unit 56 at the pan/tilt control may be constant. Alternatively, the velocity can be changed, for example, the velocity can be increased as the necessary movement amounts Span and Stilt become larger. Accordingly, the barycenter Gt of the synthetic subject can be positioned at the origin coordinates in relatively short time even if the necessary movement amount by panning or tilting is large.

If a positive determination result is obtained in step S108, that is, if the barycenter Gt of the synthetic subject is positioned at the origin coordinates, the mode flag "f" is set to 1 (f=1) in step S110, and the process returns to step S101. The state where the mode flag "f" is set to 1 in step S110 is a state where the catching mode as the first procedure in composition control has been completed and where first composition adjustment control (composition adjusting mode) should be performed.

In the case where the mode flag is set to f==1 and where the first composition adjusting mode should be performed, the process proceeds from step S107 to step S111. In the first composition adjusting mode, as can be understood from the following description, zoom (angle of view) adjustment is performed to obtain an optimum composition in accordance with the number of detected individual subjects. Note that, depending on the angle-of-view adjustment, the size of each individual subject in the screen and the distance between individual subjects may be changed.

In step S111, the number of individual subjects that have been detected is determined. If the number is 1, the procedure starting from step S112 is performed.

In step S112, whether the size of the detected individual subject is OK is determined. The state where the size of the individual subject is OK means a state where the occupancy of the image portion as the individual subject in the screen has a value within a predetermined range, as illustrated in FIG. 8B. If a negative determination result is obtained in step S112, the process proceeds to step S113, where zoom lens driving control (zoom control) is performed so that the occupancy has a value within the predetermined range, and the process returns to step S101. At this time, the zoom control is performed while maintaining the position in the horizontal (right and left) direction of the barycenter G of the individual subject (the barycenter Gt of the synthetic subject) at the position corresponding to the x coordinate (X=0) set in step S109. Accordingly, the state where the individual subject is positioned at almost the center in the horizontal direction can be maintained. Also, since the zoom-out control is performed in step S104 during the subject searching and detecting operation, the zoom control performed in step S113 is likely to be zoom-in control. However, if the occupancy is out of the predetermined range in the screen for some reason and if a negative determination result is obtained in step S112, zoom-out control is performed in step S113 so that the occupancy has a value within the predetermined range.

If a positive determination result is obtained in step S112, the process proceeds to step S114, where the mode flag "f" is set to 2. Then, the process returns to step S101. The state where the mode flag is set to f==2 is a state where the first composition adjustment has been completed and where a release operation should be performed after second composition adjustment has been performed, as can be understood from the following description.

If it is determined in step S111 that the number of detected individual subjects is 2, the procedure starting from step S115 is performed.

In step S115, it is determined whether the distance K between the two individual subjects in the screen of the captured image data is one third of the horizontal image size Cx (K==Cx/3), as illustrated in FIG. 9B. If a negative determination result is obtained here, the process proceeds to step S116, where zoom control is performed so that K==Cx/3 is satisfied. At this time, too, zoom control is performed so that the position in the horizontal direction of the barycenter Gt of the synthetic subject is maintained at the X coordinate (X=0) set in step S109. This is the same in step S119 described below. Then, if a positive determination result is obtained in step S115, that is, if K=Cx/3 is satisfied, the process proceeds to step S117, where the mode flag "f" is set to 2. Then, the process returns to step S101. If it is determined in step S111 that the number of detected individual subjects is 3, the procedure starting from step S118 is performed.

In step S118, it is determined whether the subject-to-subject distance K (in this case, the distance between the barycenter of the leftmost individual subject in the screen and the barycenter of the rightmost individual subject in the screen) in the screen of the captured image data is half of the horizontal image size Cx (K=Cx/2), as illustrated in FIG. 10B. If a negative determination result is obtained here, the process proceeds to step S119, where zoom control is performed so that K=Cx/2 is satisfied. Then, if a positive determination result is obtained in step S118, that is, if K=Cx/2 is satisfied, the process proceeds to step S120, where the mode flag "f" is set to 2. Then, the process returns to step S101.

In the state where the mode flag "f" is set to 2, the procedure of composition control corresponding to the case where the number of individual subjects is 1, 2, or 3, described above with reference to FIGS. 8A to 10B, has been completed. Thus, if it is determined in step S107 that the mode flag "f" is 2, the second composition adjusting mode is performed in the procedure starting from step S121.

For example, in the description of the composition control with reference to FIGS. 8A to 10B, how to set the position of the barycenter of the individual subject in the vertical direction of the screen is not described for simplicity. Actually, however, a better composition may be obtained by moving the position upward from the center of the screen (offset) by a necessary amount. Thus, in the actual composition control according to the embodiment, an offset amount in the vertical direction of the barycenter Gt of the synthetic subject can also be set so that a better composition can be obtained as an optimum composition. The procedure for the setting is the second composition adjusting mode, which is performed as steps S121 and S122 described below.

In step S121, it is determined whether the position of the barycenter Gt of the synthetic subject (if the number of individual subjects is 1, the barycenter G of the individual subject) has been displaced from the horizontal line (X-axis) passing the origin coordinates P on the screen by a predetermined offset amount (whether barycenter offset is OK).

If a negative determination result is obtained in step S121, the process proceeds to step S122, where tilt control is performed to move the tilt mechanism of the pan/tilt head 10 so that the barycenter is displaced by the set offset amount, and the process returns to step S101. In the stage where a positive determination result is obtained in step S121, an optimum composition according to the number of individual subjects has been obtained.

There are some methods for setting the value of the offset amount as barycenter offset corresponding to steps S121 and S122, and the method is not particularly limited. As one of the easiest setting methods, an offset value of length corresponding to one sixth of a vertical image size Cy from the center in the vertical direction can be given based on the rule of thirds. Of course, a different offset value depending on the number of individual subjects may be set in accordance with a predetermined rule.

If a positive determination result is obtained in step S121, a procedure corresponding to a release operation starting from step S123 is performed. Here, the release operation means an operation of storing the captured image data obtained at the time as still image data in a storage medium (the memory card 40). Specifically, in the case where a manual shutter operation is performed, the release operation means an operation of recording the captured image data obtained at the time as still image data in a storage medium in response to the shutter operation.

In step S123, it is determined whether conditions to perform the release operation are presently satisfied. The conditions include, for example, a focused state has been established (when autofocus control is effective) and the pan/tilt mechanism of the pan/tilt head 10 is in a stopped state.

If a negative determination result is obtained in step S123, the process returns to step S101, so as to wait until the conditions to perform the release operation are satisfied. If a positive determination result is obtained in step S123, the release operation is performed in step S124. In this way, captured image data of an optimum composition can be recorded in the embodiment.

After the release operation has ended, initial setting of necessary parameters is performed in step S125. With this setting, the mode flag "f" is set to an initial value of 0. Also, the position of the zoom lens is returned to a preset initial position.

After step S125, the process returns to step S101. By returning the process from step S125 to S101, an operation of searching for a subject, obtaining an optimum composition according to the number of individual subjects detected by search, and performing imaging and recording (release operation) is automatically repeated.

The release operation described above with reference to FIG. 11 is an operation of recording a still image based on a captured image in a recording medium. In a broader sense, the release operation according to the embodiment includes an operation of recording the above-described still image on a recording medium and an operation of obtaining necessary still image data from a captured image. Thus, the release operation also includes an operation of obtaining still image data from a captured image in order to transmit the still image data to another recording device via a data interface by the digital still camera 1 of the embodiment.

Referring to FIG. 11, the configuration of performing the zoom control corresponding to steps S112 and S113, the zoom control corresponding to steps S115 and S116, or the zoom control corresponding to steps S118 and S119 in accordance with the determination result obtained n step S111 can be regarded as that the composition determining method is changed in accordance with the number of individual subjects that have been detected.

Here, change of the composition determining method means change of the algorithm for composition determination and composition control or change of the parameter for composition determination and composition control. If it is determined in step S111 that the number of detected individual subjects is 1, zoom control is performed based on the occupancy of the image portion of the individual subject in the screen in steps S112 and S113. On the other hand, if it is determined in step S111 that the number of detected individual subjects is 2 or more, zoom control is performed based on the subject-to-subject distance K, not on the occupancy. This means that the algorithm for composition determination and composition control about size adjustment of each individual subject is changed in accordance with the number of detected individual subjects. Furthermore, in the case where the number of detected individual subjects is 2 or more, different values of Cx/3 and Cx/2 are set as the subject-tosubject distance K for the optimum composition in the cases where the number of individual subjects is 2 and 3. This means that the parameter for composition determination and composition control about size adjustment of the individual size is changed in accordance with the number of detected individual subjects.

Hereinafter, second composition control according to the embodiment is described. In the second composition control, the screen setting (composition) of captured image data is switched between a vertical composition and a horizontal composition in accordance with the number of detected individual subjects, as described below.

In the second composition control, detection of a subject is performed first in an initial state where a horizontal composition is set.

Figure 12A:
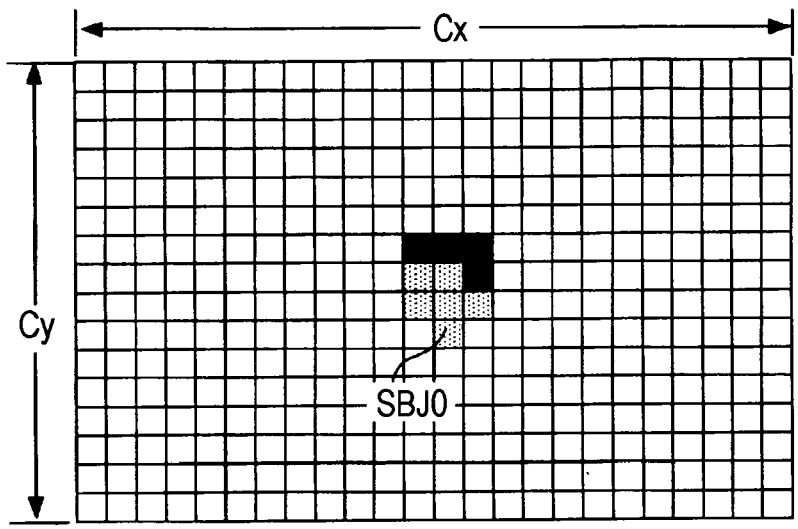
FIGS. 12A and 12B are diagrams schematically illustrating an example of second composition control in the case where the number of detected individual subjects is 1.
Figure 12B:
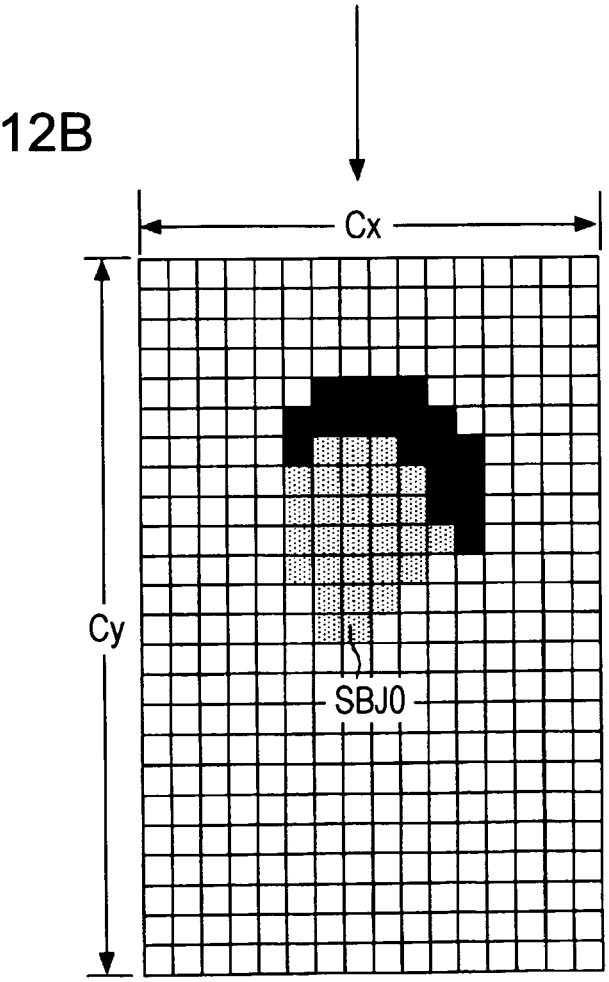

Then, assume that an individual subject SBJ0 is detected in the screen of the captured image data, as illustrated in FIG. 12A. In this case where the number of detected individual subjects is 1, a vertical composition is set in the second composition control, as indicated by transition from FIG. 12A to FIG. 12B.

Then, size adjusting (zoom) control is performed so that the occupancy of the individual subject SBJ0 in the screen has a value within the predetermined range. In this case, the position in the horizontal direction of the individual subject SBJ0 is almost the center. The position in the vertical direction is displaced upward from the center in accordance with the predetermined rule.

When the number of subjects is 1, particularly when the subject is a person, a virtual composition rather than a horizontal composition is regarded as a better composition from a comprehensive point of view. Based on this point of view, when the number of individual subjects is 1, a vertical composition is adopted, and then the size and position of the individual subject are adjusted in the second composition control.

In the embodiment, a horizontal composition can be changed to a vertical composition by extracting an image area of a vertical-composition size from the captured image data obtained in a horizontal composition. The image data portion of the vertical-composition size extracted in this manner can be used.

Alternatively, a mechanism capable of switching the digital still camera 1 to a horizontally-oriented state and a vertically-oriented state may be provided in the pan/tilt head 10, so that a composition can be changed by controlling the drive of this mechanism.

Figure 13A:
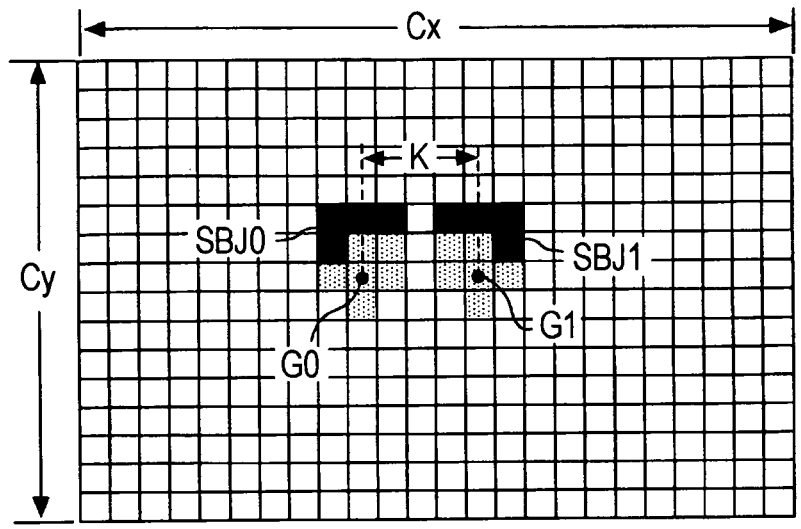
FIGS. 13A and 13B are diagrams schematically illustrating an example of the second composition control in the case where the number of detected individual subjects is 2 and where the distance between the individual subjects is detected (caught) as equal to or smaller than a predetermined value.

Also, assume that two individual subjects SBJ0 and SBJ1 are detected in the screen of captured image data, as illustrated in FIG. 13A. In the second composition control, when two individual subjects are detected as in this case, it is determined whether the subject-to-subject distance K at the angle of view at detection is equal to or smaller than a predetermined threshold.

Figure 13B:
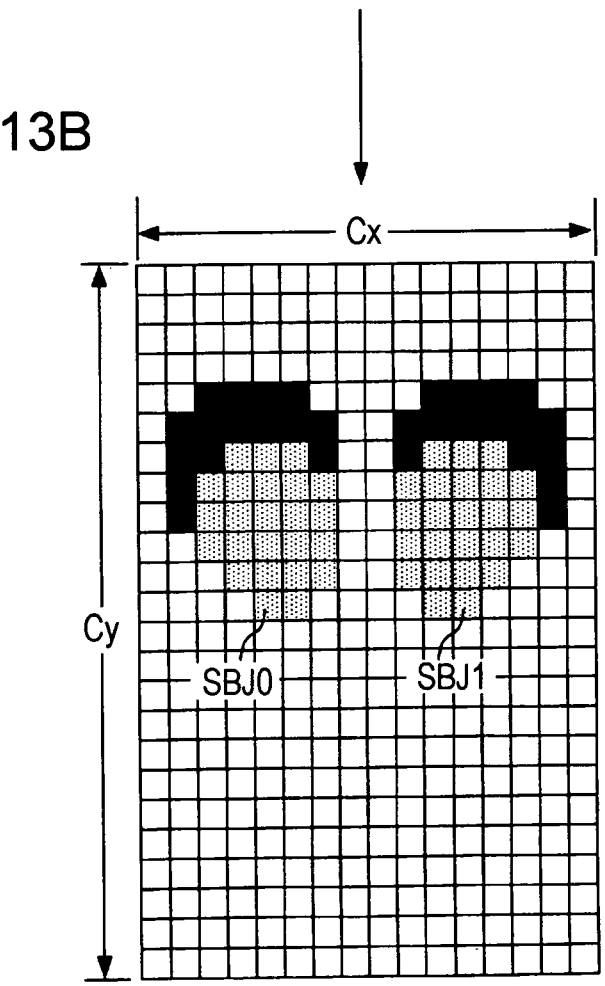

If the subject-to-subject distance K is equal to or smaller than the threshold, it can be determined that the two individual subjects are considerably close to each other. In this state, it is preferable to adopt a vertical composition rather than a horizontal composition. Thus, in this case, the composition is changed to a vertical composition, as indicated by transition from FIG. 13A to FIG. 13B. The method for changing the composition is described above. Then, zoom control or pan/tilt control is performed so that the individual subjects SBJ0 and SBJ1 have an appropriate size and are positioned at an appropriate position. In this case, too, the position in the horizontal direction of the image portion composed of the individual subjects SBJ0 and SBJ1 in the screen is set at almost the center. The position in the vertical direction is displaced upward from the center in accordance with the predetermined rule.

On the other hand, if the subject-to-subject distance K between the two detected individual subjects SBJ0 and SBJ1 is over the threshold, it can be determined that the two individual subjects are separate from each other by the corresponding distance. In this case, it is preferable to adopt a horizontal composition. Thus, in this case, the same composition control as that described above with reference to FIGS. 9A and 9B is performed.

Also, assume that three or more individual subjects SBJ0 to SBJn (n is a natural number of 3 or more) are detected in the screen of captured image data. In this case, it is preferable to adopt a horizontal composition as an entire composition. Thus, in this case, the same composition control as that described above with reference to FIGS. 10A and 10B is performed as the second composition control.

Figure 14:
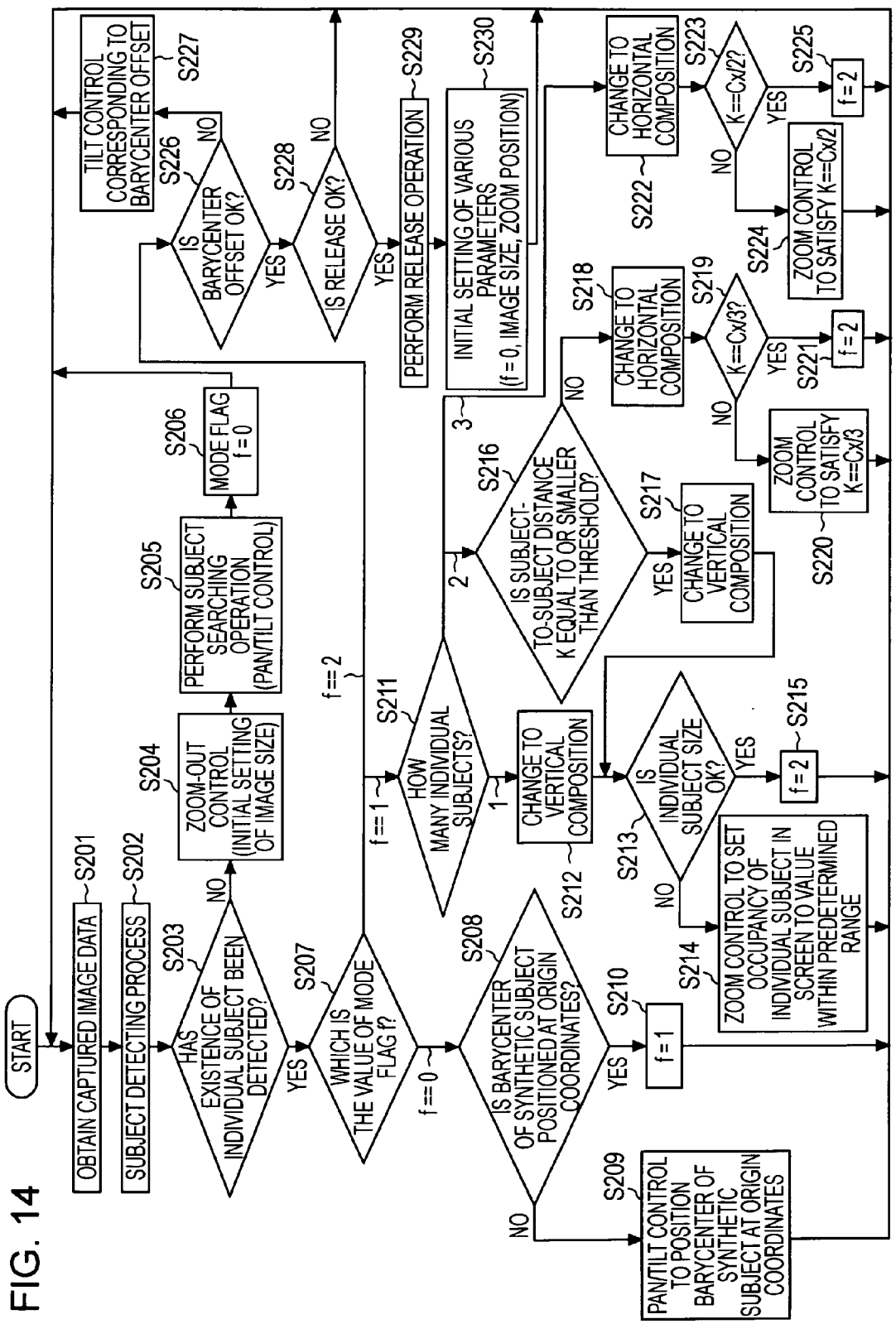
FIG. 14 illustrates a flowchart of an example of a process procedure for the second composition control.

FIG. 14 illustrates an example of a procedure corresponding to the second composition control performed by the subject detecting block 61, the composition control block 62, and the communication control block 63 illustrated in FIG. 5.

In FIG. 14, the procedure of steps S201 to S210 is the same as the procedure of steps S101 to S110 in FIG. 11. However, in step S204, zoom-out control is performed as in step S104, and also control to set a composition to an initial state (horizontal composition) is performed when the currently-set composition is a vertical composition.

In the state where the mode flag is f==1, the number of detected individual subjects is determined as in step S111, that is, it is determined whether the number is 1, 2, or 3 or more.

If it is determined in step S211 that the number of individual subjects is 1, the procedure starting from step S212 is performed.

In step S212, if the currently-set composition is a horizontal composition, control to change it to a vertical composition is performed. As this control, signal processing to extract an image area of a vertical-composition size from the captured image data of a horizontal composition may be performed, as described above. Such control is realized by the function as the composition control block 62 in the signal processing unit 24. After step S212, the process proceeds to step S213.

Steps S213 to S215 are the same as steps S112 to S114 in FIG. 11.

By performing the procedure of steps S212 to S215, the composition control described above with reference to FIGS. 12A and 12B can be performed (except upward offset of the individual subject).

If it is determined in step S211 that the number of individual subjects is 2, the procedure starting from step S216 is performed.

In step S216, it is determined whether the subject-to-subject distance K between the two detected individual subjects is equal to or smaller than the threshold. If a positive determination result is obtained, the process proceeds to step S217. If the currently-set composition is a horizontal composition, control to change it to a vertical composition is performed. Then, the procedure of steps S213 to S215 is performed.

Note that, when the process proceeds from step S217 to S213, values in a predetermined range of the occupancy corresponding to the two individual subjects, different from the values corresponding to one individual subject, are used in the procedure of steps S213 to S215. Then, if it is determined that the occupancy of the two individual subjects has a value within the predetermined range, it is determined that an appropriate size of the individual subjects has been obtained, and the mode flag "f" is set to 2 in step S215.

On the other hand, if a negative determination result is obtained in step S216, the procedure starting from step S218 is performed.

In step S218, if the currently-set composition is a vertical composition, control to change it to a horizontal composition is performed. The following steps S219 to S221 are the same as steps S115 to S117 in FIG. 11.

The second composition control in the case where the number of individual subjects is 2 is performed in the procedure of steps S216 to S221 and the procedure of steps S213 to S215 that follow step S217. That is, two types of composition control are used: the composition control of setting a vertical composition when the subject-to-subject distance K is short; and the composition control of setting a horizontal composition when the subject-to-subject distance K is long.

In step S216, only the subject-to-subject distance K in the horizontal direction of the screen is used as a factor for determining the composition to be set (horizontal or vertical). Actually, however, a subject-to-subject distance Kv in the vertical direction of the screen can be used as the determination factor in addition to the subject-to-subject distance K in the horizontal direction of the screen. The subject-to-subject distance Kv can be defined as a distance between the barycenter of the uppermost individual subject and the barycenter of the lowermost individual subject in the screen.

For example, there is a case where the distance in the vertical direction between two individual subjects is significantly long in an actual screen. In such a case, even if the distance in the horizontal direction between two individual subjects is long to some extent, a better composition may be obtained by adopting a vertical composition.

Hereinafter, description is given about an example of algorithm in the case where the subject-to-subject distance Kv in the vertical direction of the screen is used as a determination factor together with the subject-to-subject distance K in the horizontal direction of the screen in step S216.

For example, the ratio K/Kv of the subject-to-subject distance K in the horizontal direction of the screen and the subject-to-subject distance Kv in the vertical direction of the screen is obtained. Then, it is determined whether K/Kv is equal to or larger than a predetermined threshold. If it is determined that K/Kv is equal to or larger than the threshold, it can be determined that the distance between two individual subjects in the horizontal direction is longer to a certain extent than the distance between individual subjects in the vertical direction. In this case, a horizontal composition is set in step S218. On the other hand, if it is determined that K/Kv is smaller than the threshold, it can be determined that the distance between the individual subjects in the vertical direction is long to a certain extent. In this case, a vertical composition is set in step S217.

Alternatively, as in the above-described case, the subject-to-subject distance K in the horizontal direction of the screen may be compared with the predetermined threshold, and if the subject-to-subject distance K is equal to or lower than the threshold, a vertical composition is set in step S217. On the other hand, if the subject-to-subject distance K is over the threshold, then the subject-to-subject distance Kv in the vertical direction of the screen is compared with the predetermined threshold. The threshold that is compared with the subject-to-subject distance Kv is not necessarily equal to the threshold for the subject-to-subject distance K, and a value appropriately set for the subject-to-subject distance Kv may be used. If the subject-to-subject distance Kv is equal to or smaller than the threshold, a horizontal composition is set in step S218. If the subject-to-subject distance Kv is over the threshold, a vertical composition is set in step S217.

If it is determined in step S211 that the number of individual subjects is 3, the procedure stating from step S222 is performed. In step S222, if the currently-set composition is a vertical composition, control to change it to a horizontal composition is performed. The subsequent procedure of steps S223 to S225 is the same as that of steps S118 to S120 in FIG. 11.

In the state where the mode flag "f" is set to 2 as a result of the above-described procedure, the procedure starting from step S226 is performed.

The procedure of steps S226 and S227 is the same as that of steps S121 and S122 in FIG. 11. By performing this procedure, a composition where the individual subject is displaced upward from the center in the screen can be obtained, as described above with reference to FIGS. 12A to 13B.

Steps S228 to S230 correspond to a procedure about a release operation, as steps S123 to S125 in FIG. 11. By performing this procedure, captured image data that has obtained an optimum composition through the composition control can be recorded on a storage medium.

In the entire flow of the procedure of each composition control illustrated in FIGS. 11 and 14, a composition regarded as optimum is determined and decided in accordance with the number of detected individual subjects, and zoom control and pan/tilt control are appropriately performed to actually obtain (reflect) captured image data of the determined composition.

In the procedure of each composition control illustrated in FIGS. 11 and 14, basically a composition is determined based on any of three conditions where the number of detected individual subjects is 1, 2, and 3 or more. However, this is only an example, and a composition may be determined based on a more specific number of individual subjects when the number of individual subjects is 3 or more.

For example, regarding an algorithm for composition determination: which of vertical and horizontal compositions should be set, if the number of detected individual subjects is 2 in FIG. 14, any of vertical and horizontal compositions is selected in accordance with the subject-to-subject distance K, but a horizontal composition is uniformly set if the number of detected individual subjects is 3 or more. Alternatively, even if the number of detected individual subjects is 3 or more, any of vertical and horizontal compositions may be selected based on a result of comparison between the threshold that is set for each number of detected individual subjects and the subject-to-subject distance K at the time. That is, determination of a vertical composition or a horizontal composition can be performed based on the subject-to-subject distance K if the number of detected individual subjects is 2 or more. Also, the subject-to-subject distance Kv in the vertical direction described above in relation to step S216 can be added to the determination factor.

In the use of the imaging system according to the embodiment, the following situation may occur. That is, in an environment where many people exist around the imaging system, composition control should be performed on only one or a plurality of specific people. In such a situation, if an algorithm to simply recognize all detected faces as individual subjects is used under the assumption that the subject detecting process is based on a face detecting technique, appropriate composition control is not performed on the specific people. Particularly, a different composition is set in accordance with the number of individual subjects in the composition control according to the embodiment, and thus the possibility that a composition not desired by a user may be set becomes high.

In order to take measures against the above-described situation in the embodiment, the following subject discriminating process may be performed in the subject detecting process in step S102 in FIG. 11 or step S202 in FIG. 14.

In this case, setting is made so that a maximum number of individual subjects as a target of composition control (target individual subjects) can be set by an operation on the digital still camera 1. Information of the set maximum number of target individual subjects is held by the subject detecting block 61, for example. In this case, assume that 2 is set as the maximum number of target individual subjects.

Figure 15A:
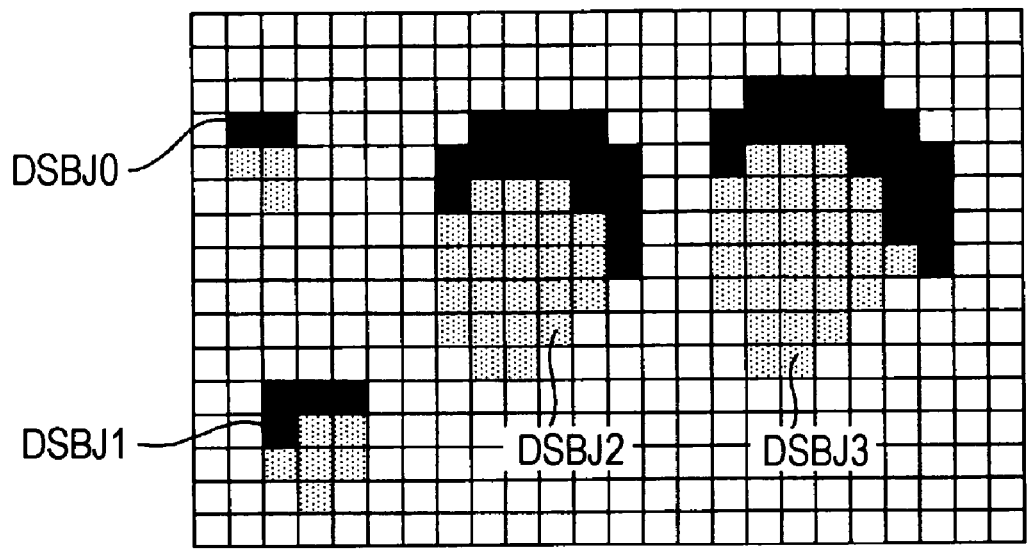
FIGS. 15A and 15B are diagrams illustrating subject discrimination according to the embodiment.
Figure 15B:
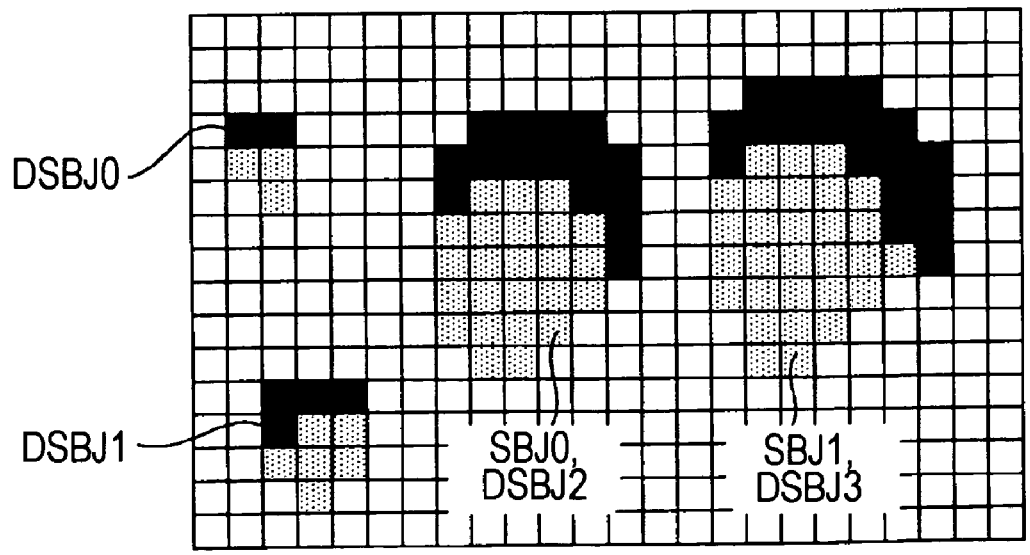

Then, assume that captured image data of the image content illustrated in FIG. 15A is obtained as a result of the subject searching operation (step S105 or S205). In the subject detecting process in step S102 or S202 corresponding to this case, the existence of four individual subjects is detected through face detection. The individual subjects detected in this stage are regarded as "candidate subjects". In FIG. 15A, the four candidate subjects in the screen are denoted by reference symbols DSBJ0, DSBJ1, DSBJ2, and DSBJ3 from left to right.

In this way, the four subjects (candidate subjects) are detected as a result of simple face detection. In this case, however, 2 is set as the maximum number of target individual subjects, as described above. Based on the maximum number, the subject detecting block 61 selects two candidate subjects in decreasing order of size from among the four candidate subjects DSBJ0, DSBJ1, DSBJ2, and DSBJ3. The selected subjects are regarded as target individual subjects. In this case, the two individual subjects of the largest size among the candidate subjects DSBJ0, DSBJ1, DSBJ2, and DSBJ3 are the candidate subjects DSBJ2 and DSBJ3. Thus, the subject detecting block 61 regards the candidate subjects DSBJ2 and DSBJ3 as target individual subjects SBJ0 and SBJ1, respectively, and ignores the candidate subjects DSBJ0 and DSBJ1 as non-target individual subjects. Then, in the procedure for composition control starting from step S107 in FIG. 11 or step S207 in FIG. 14, control is performed on only the target individual subjects. By performing such subject discrimination, shooting can be performed based on appropriate composition control for specific people when those people as a target of composition control are placed at a position closest to the imaging system, even in an environment or situation where many people exist around the imaging system.

The flowchart in FIG. 16 illustrates an example of a procedure for the above-described subject discrimination that is performed as part of the subject detecting process in step S102 in FIG. 11 or step S202 in FIG. 14.

In this process, all subjects detected in a face detecting process are regarded as candidate subjects. In step S301, it is determined whether at least one candidate subject has been detected. If it is determined that at least one candidate subject has been detected, the process proceeds to step S302.

In step S302, it is determined whether the currently-set maximum number of target individual subjects is equal to or larger than the number of candidate subjects detected in step S301.

If a positive determination result is obtained in step S302, it can be determined that the number of candidate subjects does not exceed the maximum number of target individual subjects. Thus, the process proceeds to step S303, where all the detected candidate subjects are set as target individual subjects.

On the other hand, if a negative determination result is obtained in step S302, it can be determined that the number of candidate subjects is larger than the maximum number of target individual subjects. In this case, the process proceeds to step S304, where the candidate subjects corresponding to maximum number of target individual subjects are selected from among the detected candidate subjects in decreasing order of size. Then, in step S305, the selected candidate subjects are set as target individual subjects. Accordingly, subject discrimination can be performed.

By performing the procedure illustrated in FIG. 16, information including the number of target individual subjects set in step S303 or S305 and the size and position of each target individual subject is output as detection information to the composition control block 62, as a result of the subject detecting process performed in step S102 in FIG. 11 or step S202 in FIG. 14. The composition control block 62 performs the composition control starting from step S107 in FIG. 11 or step S207 in FIG. 14 by using the detection information.

Figure 17:
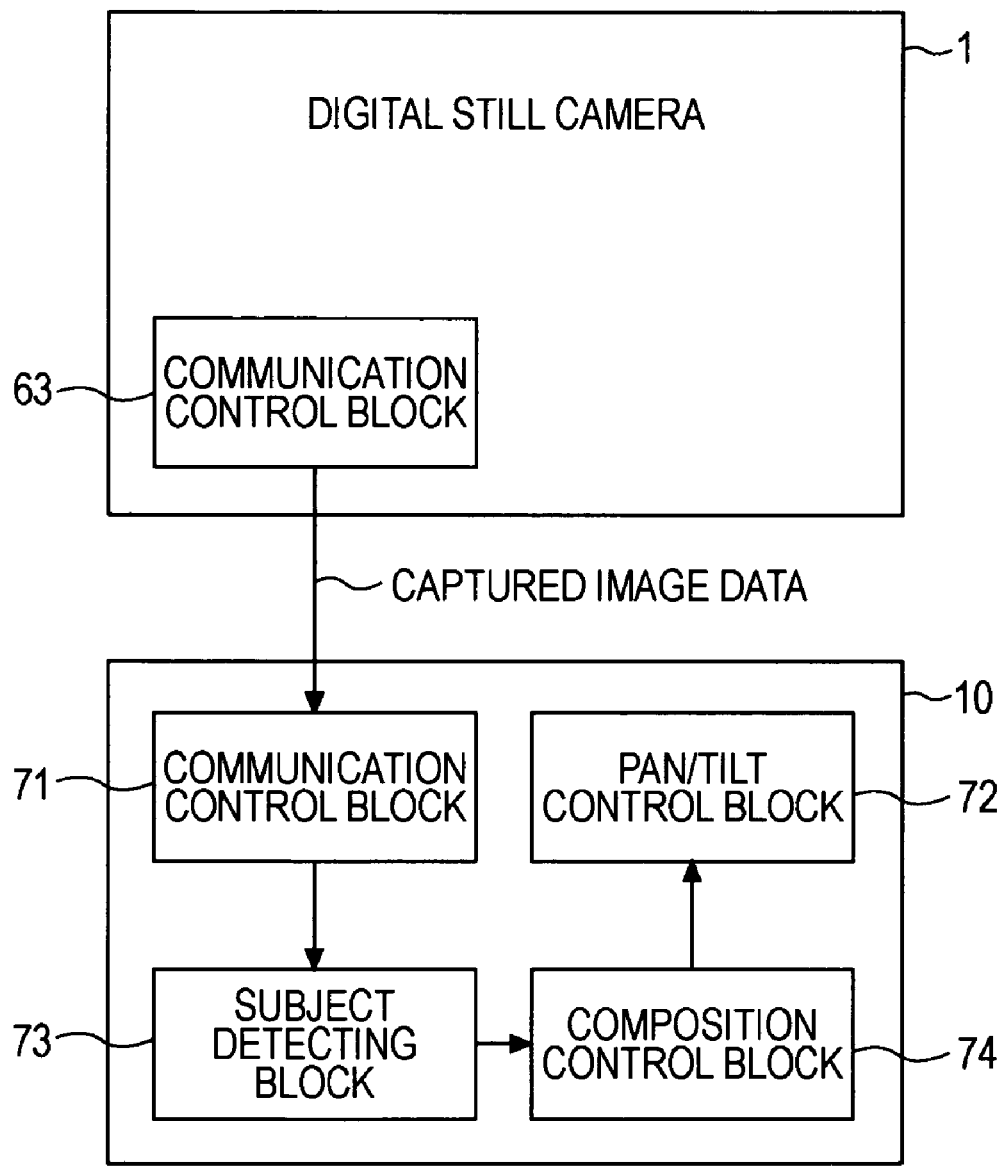
FIG. 17 is a diagram illustrating an example of a configuration as a modification of the imaging system according to the embodiment.

FIG. 17 illustrates an example of a configuration as a modification of the imaging system according to the embodiment.

In FIG. 17, captured image data generated by the signal processing unit 24 based on imaging is transmitted from the digital still camera 1 to the pan/tilt head 10 via the communication control block 63.

In FIG. 17, the pan/tilt head 10 includes a communication control block 71, a pan/tilt control block 72, a subject detecting block 73, and a composition control block 74.

The communication control block 71 is a functional unit corresponding to the communication unit 52 illustrated in FIG. 4 and performs communication with the communication control block 63 (pan/tilt head-compatible communication unit 34) on the digital still camera 1 side in accordance with a predetermined protocol.

The captured image data received by the communication control block 71 is supplied to the subject detecting block 73. The subject detecting block 73 includes a signal processing unit capable of performing at least the subject detecting process equivalent to that performed by the subject detecting block 61 illustrated in FIG. 5, performs the subject detecting process on the captured image data supplied thereto, and outputs detection information to the composition control block 74.

The composition control block 74 is capable of performing the composition control equivalent to that performed by the composition control block 62 illustrated in FIG. 5. When pan control or tilt control is performed as a result of the composition control, the composition control block 74 outputs a control signal for the control to the pan/tilt control block 72.

The pan/tilt control block 72 corresponds to a function to perform a process about pan/tilt control among control processes performed by the control unit 51 illustrated in FIG. 4, and outputs a signal to control the movement of the pan mechanism unit 53 or the tilt mechanism unit 56 to the pan driving unit 55 or the tilt driving unit 58 in response to the control signal input thereto. Accordingly, panning or tilting is performed to obtain the composition determined by the composition control block 62.

As described above, in the imaging system illustrated in FIG. 17, captured image data is transmitted from the digital still camera 1 to the pan/tilt head 10, and a subject detecting process and composition control based on the captured image data are performed on the side of the pan/tilt head 10.

Figure 18:
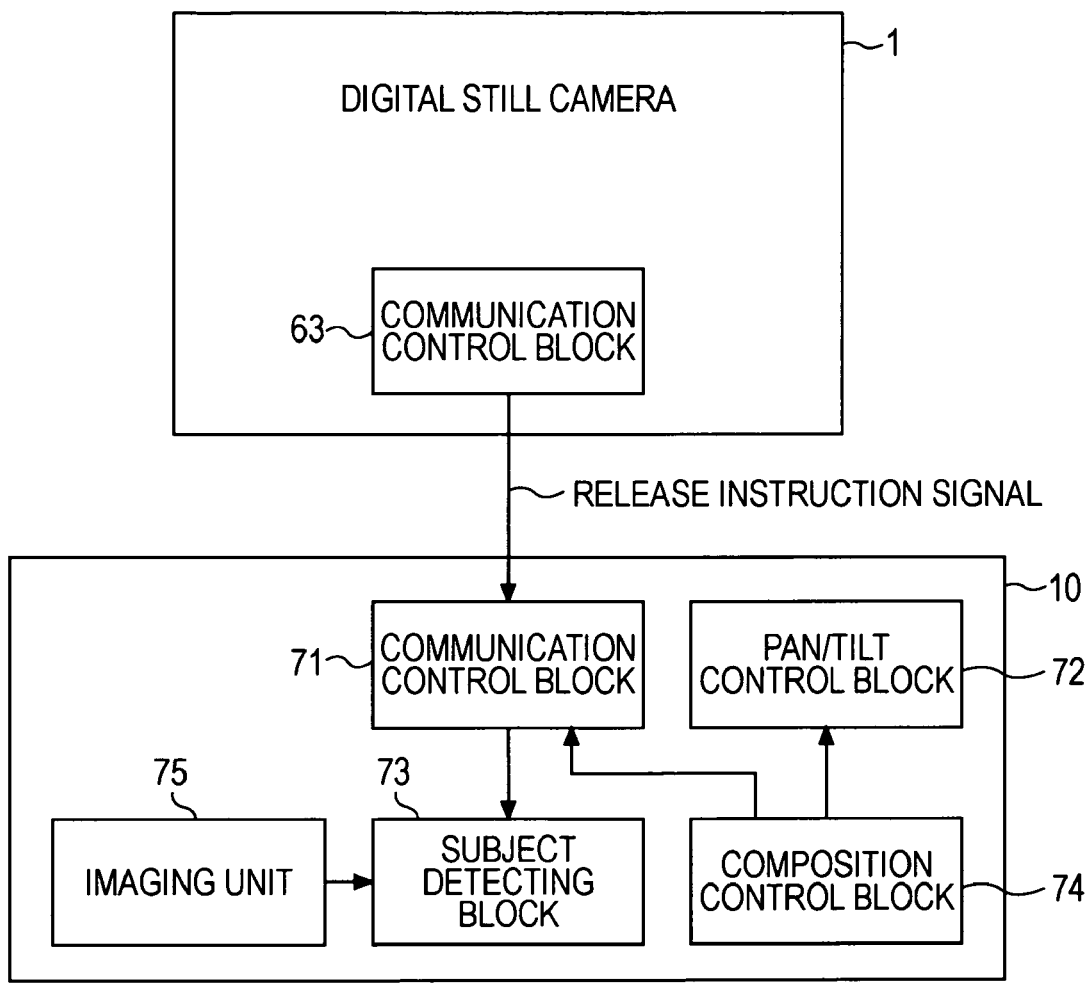
FIG. 18 is a diagram illustrating an example of a configuration as another modification of the imaging system according to the embodiment.

FIG. 18 illustrates an example of a configuration as another modification of the imaging system according to the embodiment. In FIG. 18, parts that are the same as those in FIG. 17 are denoted by the same reference numerals and the corresponding description is omitted.

In this system, an imaging unit 75 is provided in the pan/tilt head 10. The imaging unit 75 includes an optical system and an imaging device (imager) for imaging so as to obtain signals (imaging signals) based on imaging light. Also, the imaging unit 75 includes a signal processing unit to generate captured image data based on the imaging signals. This configuration corresponds to the unit in a signal processing stage for obtaining captured image data, including the optical system unit 21, the image sensor 22, the A/D converter 23, and the signal processing unit 24 illustrated in FIG. 3. The captured image data generated by the imaging unit 75 is output to the subject detecting block 73. Incidentally, the direction in which the imaging unit 75 takes in imaging light (imaging direction) is set so as to be matched as much as possible with the imaging direction of the optical system unit 21 (lens unit 3) of the digital still camera 1 placed on the pan/tilt head 10.

In this case, the subject detecting block 73 and the composition control block 74 perform a subject detecting process and a composition control process in the same manner as that in FIG. 17. However, the composition control block 74 in this case performs pan/tilt control and also allows the communication control block 71 to transmit a release instruction signal to the digital still camera 1 at the timing to perform a release operation. In the digital still camera 1, a release operation is performed upon reception of the release instruction signal.

As described above, in this modification, the entire subject detecting process and composition control except the release operation can be performed on the side of the pan/tilt head 10.

Furthermore, the subject detection and composition control in the imaging system according to the embodiment can be modified in the following manner.

Composition control in particularly the horizontal (right or left) direction is not described above. However, according to the rule of thirds, for example, a good composition can be obtained by displacing a subject to any of right and left from the center. Thus, the barycenter of a subject (the barycenter of an individual subject or a synthetic subject) may be actually moved to right or left by a necessary amount as composition control according to the number of individual subjects.

The pan control and tilt control performed in composition control illustrated in FIGS. 11 and 14 are performed by controlling the movement of the pan/tilt mechanism of the pan/tilt head 10. Alternatively, another configuration may be adopted instead of the pan/tilt head 10. For example, imaging light reflected by a reflective mirror may be allowed to enter the lens unit 3 of the digital still camera 1, and the reflected light may be moved to obtain a panning/tilting result of an image obtained based on the imaging light.

Also, a result equivalent to that of panning/tilting can be obtained by performing control to shift a pixel area to take in imaging signals effective as an image from the image sensor 22 of the digital still camera 1 in the horizontal and vertical directions. In this case, the pan/tilt head 10 or an alternative apparatus for pan/tilt other than the digital still camera 1 is unnecessary, and the entire composition control according to the embodiment can be performed by the digital still camera 1 alone.

Also, panning/tilting can be performed by providing a mechanism capable of changing the optical axis of the lenses in the optical system unit 21 in the horizontal and vertical directions and by controlling the movement of the mechanism.

The configuration for determining a composition based on the embodiment of the present invention can be applied to a system or apparatus other than the imaging system described above as the embodiment. Hereinafter, application examples of composition determination according the embodiment of the present invention are described.

Figure 19:
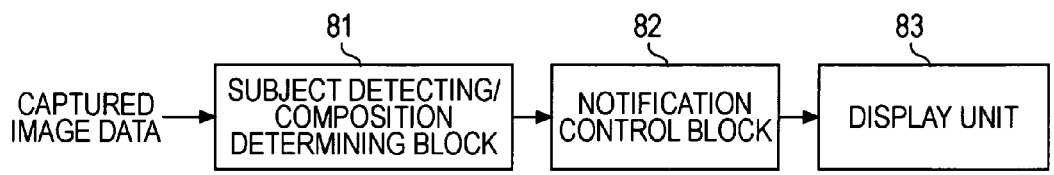
FIG. 19 is a diagram illustrating an application example of composition determination based on the embodiment of the present invention.

First, referring to FIG. 19, the composition determination according to the embodiment of the present invention is applied to a single imaging apparatus, such as a digital still camera. For example, when an appropriate composition of an image being captured by an imaging apparatus is obtained in an imaging mode, a user is notified of this fact through display.

The configuration that should be provided in the imaging apparatus for this purpose includes a subject detecting/composition determining block 81, a notification control block 82, and a display unit 83.

The subject detecting/composition determining block 81 takes in captured image data and performs a subject detecting process equivalent to that performed by the subject detecting block 61 illustrated in FIG. 5 and a composition determining process equivalent to that performed by the composition control block 62 illustrated in FIG. 5 by using detection information as a result of the subject detecting process.

For example, assume that the user holds in hand the imaging apparatus that is set to an imaging mode, and that he/she can record a captured image any time by performing a release operation (shutter button operation).

Under this state, the subject detecting/composition determining block 81 takes in captured image data obtained through imaging at the time and performs subject detection. Then, an optimum composition is specified in accordance with the number of detected individual subjects and so on in a composition control process. Note that, in this composition determining process, the consistency and similarity between the composition of the image content of the captured image data obtained at the time and the optimum composition are determined. If a predetermined degree or more of similarity is obtained, it is determined that the image content of the captured image data that is actually obtained through shooting has the optimum composition. Actually, an algorithm is configured so that a determination of an optimum composition is given if a predetermined degree or more of similarity is obtained and if it is determined that the composition of the image content of the captured image data matches the optimum composition. There are various algorithms to calculate the consistency and similarity, and thus specific examples are not described here.

Information of a determination result indicating that the image content of the captured image data has an optimum composition is output to the notification control block 82. Upon receiving the information, the notification control block 82 performs display control so that a notification indicating that the image currently being captured has an optimum composition to the user is displayed in the display unit 83 in a predetermined manner. The notification control block 82 is realized by a display control function, such as a microcomputer (CPU) included in the imaging apparatus, and a displayed image processing function to realize display of an image in the display unit 83. The notification to the user indicating that an optimum composition is obtained may be performed by using sound, such as electronic sound or synthetic voice.

The display unit 83 corresponds to the display unit 33 of the digital still camera 1 of the embodiment. Typically, a display panel of the display unit is provided in a predetermined position of the imaging apparatus while being exposed, and an image that is currently being captured (so-called through image) is displayed thereon in a shooting mode. Thus, in the actual imaging apparatus, an image notifying the user of an optimum composition is displayed in the display unit 83 while being superimposed on the through image. The user performs a release operation when this notification image appears. Accordingly, even a user who does not have sufficient knowledge and technique of photography can easily take a photo of a good composition.

Figure 20:
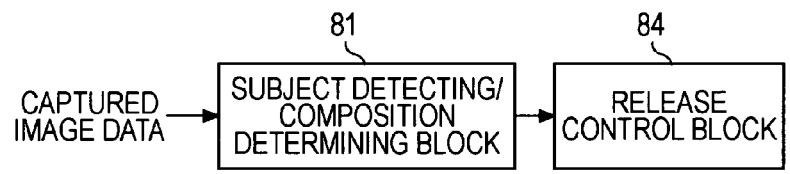
FIG. 20 is a diagram illustrating an application example of composition determination based on the embodiment of the present invention.

FIG. 20 illustrates an example in which the composition determination according to the embodiment of the present invention is applied to a single imaging apparatus, such as a digital still camera, as in FIG. 19.

In the configuration illustrated in FIG. 20, the subject detecting/composition determining block 81 takes in captured image data obtained through imaging at the time and performs a subject detecting process, and also determines whether the image content of the captured image data has an optimum composition based on subject detection information, as in FIG. 19. After determining that the image content has an optimum composition, the subject detecting/composition determining block 81 notifies a release control block 84 of the determination result.

The release control block 84 performs control to record captured image data and is realized by control performed by a microcomputer included in the imaging apparatus, for example. The release control block 84 that has received the notification performs image signal processing and recording control so that the captured image data obtained at the time is stored in a storage medium or the like.

With this configuration, the imaging apparatus can automatically record a captured image when an image of an optimum composition is captured.

The configurations illustrated in FIGS. 19 and 20 can be applied to a digital still camera having the configuration illustrated in FIG. 1 in a category of a still camera. Also, those configurations can be applied to a so-called silver salt camera, which records a captured image on a silver salt film, by providing an image sensor to divide imaging light obtained by an optical system and take in the divided light and a digital image signal processing unit to receive and process signals from the image sensor.

Figure 21:
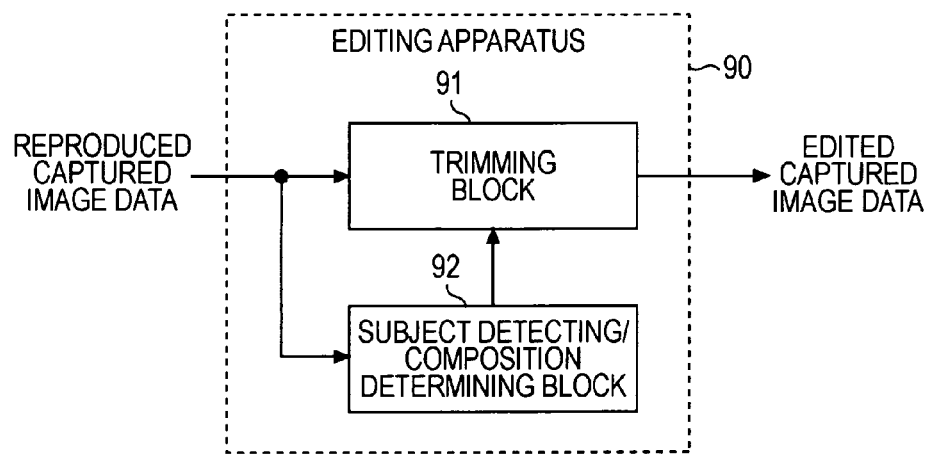
FIG. 21 is a diagram illustrating an application example of composition determination based on the embodiment of the present invention.

FIG. 21 illustrates an example in which the embodiment of the present invention is applied to an editing apparatus to edit existing image data.

FIG. 21 illustrates an editing apparatus 90. The editing apparatus 90 obtains image data from a storage medium through reproducing (reproduced image data) as existing image data. Other than the image data reproduced from the storage medium, image data that is downloaded via a network may be obtained. That is, the path used to obtain captured image data by the editing apparatus 90 is not particularly limited.

The reproduced captured image data obtained by the editing unit 90 is input to each of a trimming block 91 and a subject detecting/composition determining block 92.

First, the subject detecting/composition determining block 92 performs a subject detecting process as in FIGS. 19 and 20 and outputs detection information. Then, as a composition determining process using the detection information, the subject detecting/composition determining block 92 specifies an image portion having a predetermined aspect ratio to obtain an optimum composition (image portion of an optimum composition) in the entire screen as the reproduced captured image data input thereto. Then, after specifying the image portion of the optimum composition, the subject detecting/composition determining block 92 outputs information indicating the position of the image portion (trimming instruction information) to the trimming block 91.

In response to the input of the trimming instruction information, the trimming block 91 performs image processing to extract the image portion indicated by the trimming instruction information from the reproduced captured image data input thereto and outputs the extracted image portion as independent image data. This is edited captured image data.

With this configuration, trimming of newly obtaining image data by extracting a portion of an optimum composition from the image content of original image data is automatically performed as an editing process of image data. Such an editing function may be adopted as an application to edit image data installed into a personal computer or the like or as an image editing function in an application to manage image data.

Figure 22:
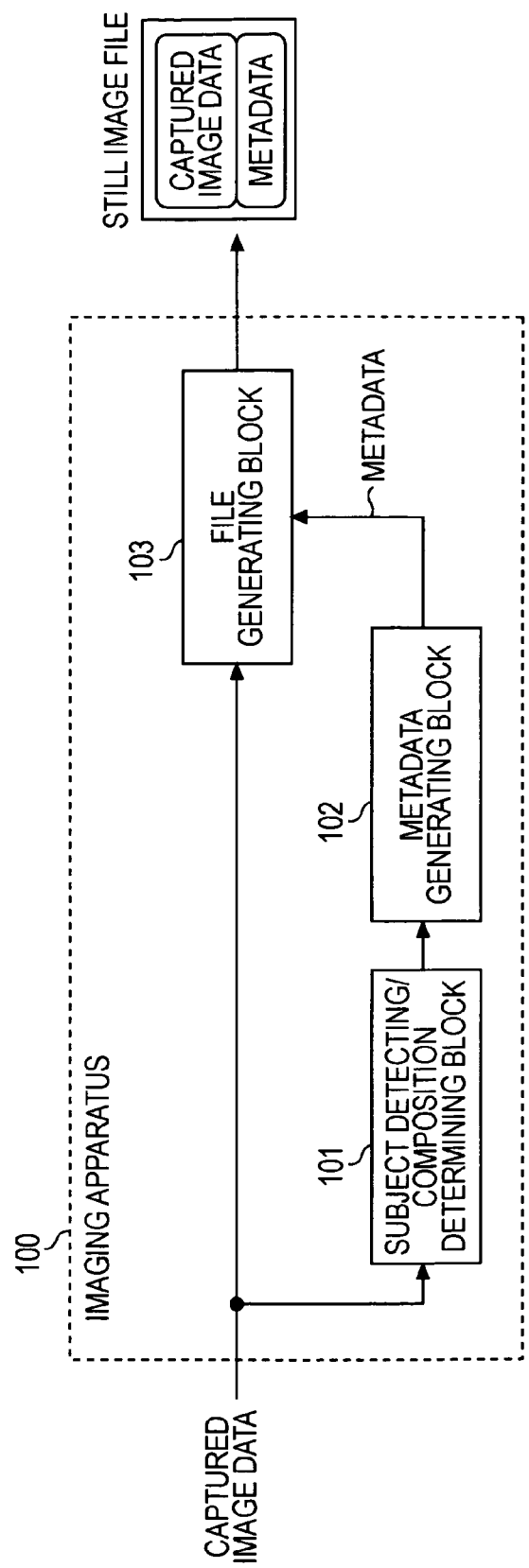
FIG. 22 is a diagram illustrating an application example of composition determination based on the embodiment of the present invention.

FIG. 22 is an example of a configuration in which the composition determination according to the embodiment of the present invention is applied to an imaging apparatus, such as a digital still camera.

Captured image data obtained through imaging by an imaging unit (not illustrated) is input to a subject detecting/composition determining block 101 and a file generating block 103 in an imaging apparatus 100. In this case, the captured image data input to the imaging apparatus 100 is captured image data that should be stored in a storage medium by a release operation or the like and is generated based on imaging signals obtained through imaging by the imaging unit (not illustrated).

First, the subject detecting/composition determining block 101 performs subject detection on the captured image data input thereto and determines an optimum composition based on detection information. Specifically, as in the case illustrated in FIG. 21, information specifying an image portion of an optimum composition in the entire screen of the input captured image data may be obtained. Then, the subject detecting/composition determining block 101 outputs information indicating a determination result of the optimum composition obtained in this way to a metadata generating block 102.

The metadata generating block 102 generates metadata (composition editing metadata) including information necessary to obtain an optimum composition from the corresponding captured image data based on the input information and outputs the metadata to the file generating block 103. The composition editing metadata includes, for example, position information that can indicate an image area portion on which trimming is to be performed in the screen as the corresponding captured image data.

In the imaging apparatus 100 illustrated in FIG. 22, captured image data is recorded on a storage medium so that the data is managed as a still image file of a predetermined format. For this purpose, the file generating block 103 converts captured image data to a still image file format (generates a still image file).

First, the file generating block 103 performs image compression coding corresponding to the image file format on the captured image data input thereto, so as to generate a file main body composed of captured image data. Also, the file generating block 103 generates a header and a data portion including an additional information block while storing the composition editing metadata received from the metadata generating block 102 in a predetermined storage position. Then, the file generating block 103 generates a still image file based on the file main body, header, and additional information block and outputs the still image file. Accordingly, the still image file that should be recorded on a storage medium and that has a configuration including the captured image data and the metadata (composition editing metadata) can be obtained as illustrated in FIG. 22.

Figure 23:
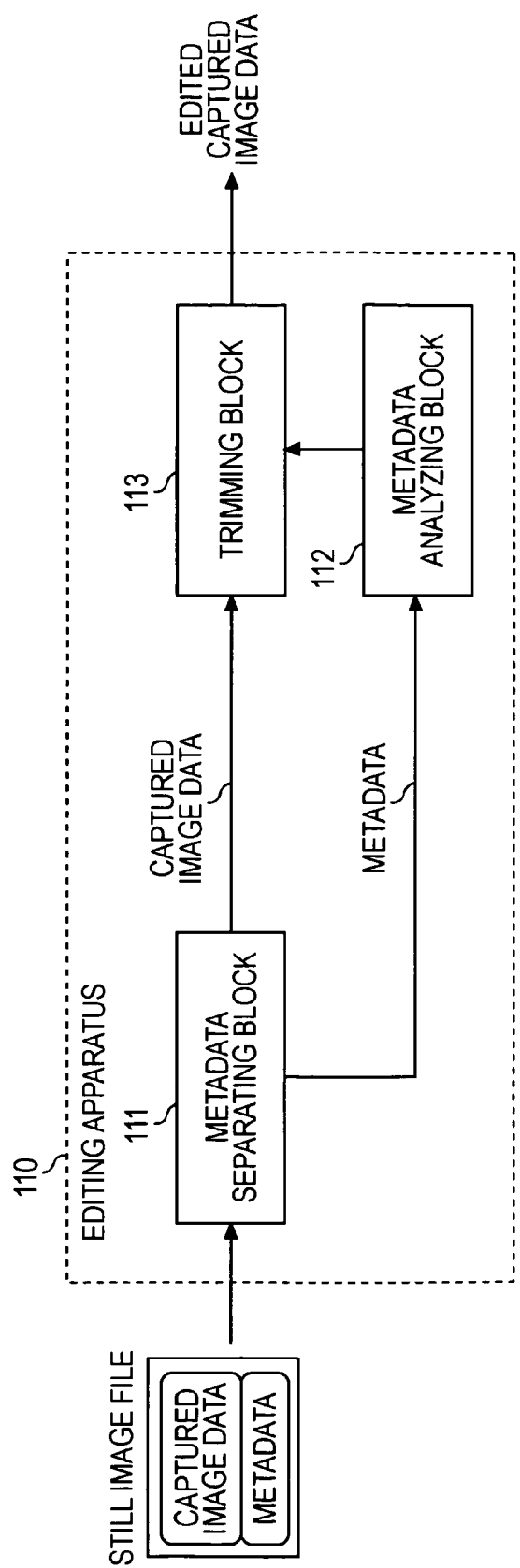
FIG. 23 is a diagram illustrating an application example of composition determination based on the embodiment of the present invention.

FIG. 23 illustrates an example of a configuration of an editing apparatus to edit a still image file generated by the apparatus illustrated in FIG. 22.

The editing apparatus 110 illustrated in FIG. 23 takes in data of a still image file and inputs the data to a metadata separating block 111. The metadata separating block 111 separates captured image data corresponding to a file main body from metadata in the data of the still image file. The metadata obtained thorough separation is output to a metadata analyzing block 112, whereas the captured image data is output to a trimming block 113.

The metadata analyzing block 112 analyzes the obtained metadata. As an analyzing process, the metadata analyzing block 112 specifies at least an image area on which trimming should be performed in the corresponding captured image data with reference to information to obtain an optimum composition included in the composition editing metadata. Then, the metadata analyzing block 112 outputs trimming instruction information to provide instructions to perform trimming of the specified image area to the trimming block 113.

As the trimming block 91 illustrated in FIG. 21, the trimming block 113 performs image processing to extract the image portion indicated by the trimming instruction information input from the metadata analyzing block 112 from the captured image data input from the metadata separating block 111, and outputs the extracted image portion as edited captured image data, which is independent image data.

According to the system including the imaging apparatus and the editing apparatus illustrated in FIGS. 22 and 23, edit of extracting an image of an optimum composition from original still image data by using metadata can be performed while storing the original still image data obtained by shooting (captured image data) in an unprocessed state. In addition, the image portion to be extracted corresponding to the optimum composition is automatically decided.

Figure 24:
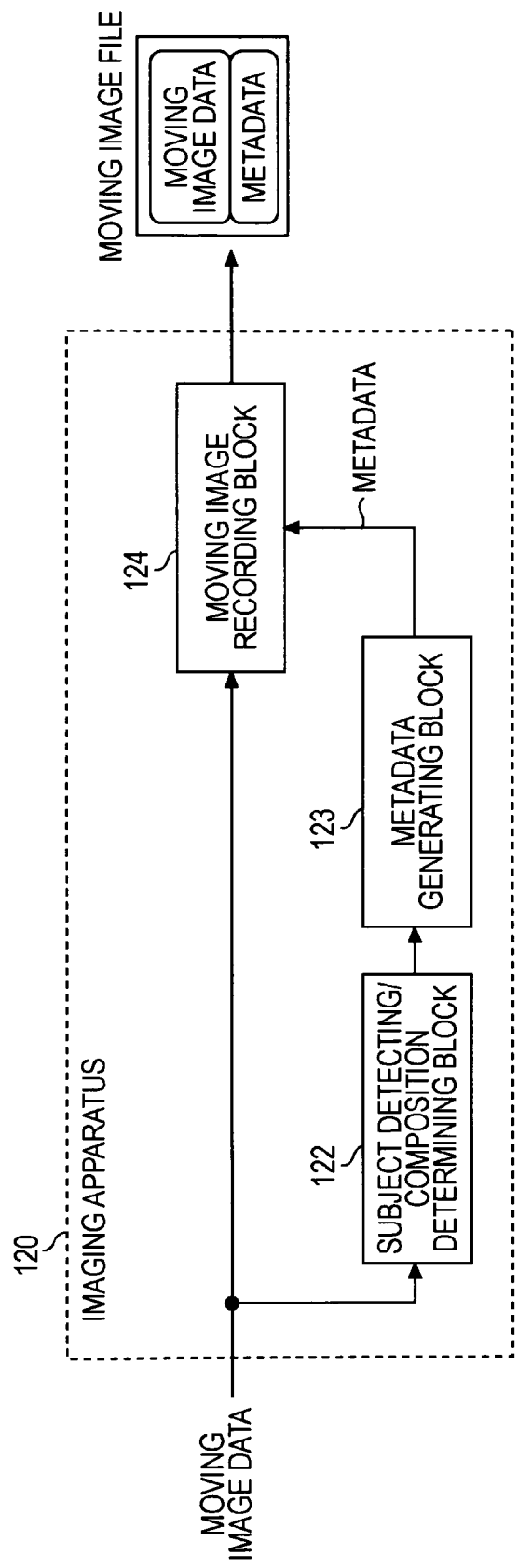
FIG. 24 is a diagram illustrating an application example of composition determination based on the embodiment of the present invention.

FIG. 24 illustrates an example in which the embodiment of the present invention is applied to an imaging apparatus capable of capturing and recording moving images, such as a video camera.

Moving image data is input to an imaging apparatus 120 illustrated in FIG. 21. The moving image data is generated based on imaging signals obtained through imaging by an imaging unit included in the imaging apparatus 120. The moving image data is input to a subject detecting/composition determining block 122 and a moving image recording block 124 in the imaging apparatus 120.

The subject detecting/composition determining block 122 in this case determines whether a composition of moving image data input thereto is good or unfavorable. For example, the subject detecting/composition determining block 122 holds parameters (good composition corresponding parameters) defining a good composition. The parameters include the occupancy in the screen set as appropriate for each detected individual subject, and the subject-to-subject distance K. The subject detecting/composition determining block 122 continuously performs composition determination on moving image data input thereto (for example, calculates composition parameters, such as the occupancy of actual individual subjects in the moving image data and the subject-to-subject distance K) and compares the composition parameters of the moving image data obtained as a determination result with the above-described good composition corresponding parameters. If the composition parameters of the moving image data have a predetermined degree or more of similarity with respect to the good composition corresponding parameters, it is determined that the moving image data has a good composition. Otherwise, it is determined that the moving image data has an unfavorable composition.

If the subject detecting/composition determining block 122 determines that the moving image data has a good composition, it outputs information indicating an image section that has been determined to have a good composition (good composition image section) in the moving image data (good composition image section indicating information) to the metadata generating block 123. The good composition image section indicating information is information indicating a start position and an end position of the good composition image section in the moving image data, for example.

The metadata generating block 123 in this case generates various necessary metadata about moving image data to be recorded as a file on a storage medium by the moving image recording block 124 described below. When receiving good composition image section indicating information from the subject detecting/composition determining block 122 in the above-described manner, the metadata generating block 123 generates metadata indicating that the image section indicated by the input good composition image section indicating information has a good composition, and outputs the metadata to the moving image recording block 124.

The moving image recording block 124 performs control to record the input moving image data on a storage medium so that the moving image data is managed as a moving image file of a predetermined format. When metadata is output from the metadata generating block 123, the moving image recording block 124 performs control so that the metadata is recorded while being included in metadata attached to the moving image file.

Accordingly, as illustrated in FIG. 24, the moving image file recorded on a storage medium includes moving image data obtained through imaging and metadata indicating the image section having a good composition, the metadata being attached to the moving image data.

The image section having a good composition indicated by metadata in the above-described manner may be an image section of a moving image having a certain time width or may be a still image extracted from moving image data. Alternatively, moving image data or still image data of an image section having a good composition may be generated instead of the above-described metadata, and the generated data may be recorded as side still image data added to the moving image file (or as a file independent of the moving image file).

Furthermore, in the configuration illustrated in FIG. 24 where the imaging apparatus 120 includes the subject detecting/composition determining block 122, only a section of a moving image determined to be a good composition image section by the subject detecting/composition determining block 122 may be recorded as a moving image file. Furthermore, image data corresponding to an image section determined to be a good composition by the subject detecting/composition determining block 122 may be output to an external apparatus via a data interface or the like.

Figure 25:
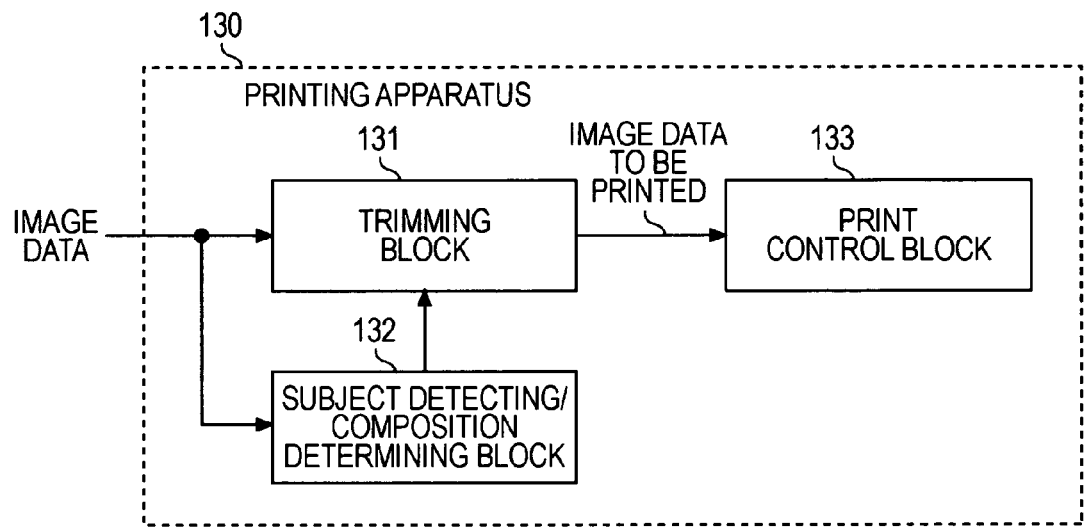
FIG. 25 is a diagram illustrating an application example of composition determination based on the embodiment of the present invention.

FIG. 25 illustrates an example in which the embodiment of the present invention is applied to a printing apparatus to perform printing.

In this case, a printing apparatus 130 takes in image data (still image) having image content to be printed. The data that has been taken in is input to a trimming block 131 and a subject detecting/composition determining block 132.

First, the subject detecting/composition determining block 132 performs the subject detecting/composition determining process same as that performed by the subject detecting/composition determining block 92 illustrated in FIG. 21, so as to specify an image portion of an optimum composition in the entire screen of the input image data, generates trimming instruction information according to a processing result, and outputs the information to the trimming block 131.

The trimming block 131 performs image processing to extract the image portion indicated by the trimming instruction information from the input image data in the same manner as in the trimming block 91 illustrated in FIG. 21. Then, the trimming block 131 outputs the data of the extracted image portion to a print control block 133 as image data to be printed.

The print control block 133 performs control to operate a printing mechanism (not illustrated) by using the input image data to be printed.

With this operation, in the printing apparatus 130, an image portion having an optimum composition is automatically extracted from the image content of the input image data and is printed on a sheet.

Figure 26:
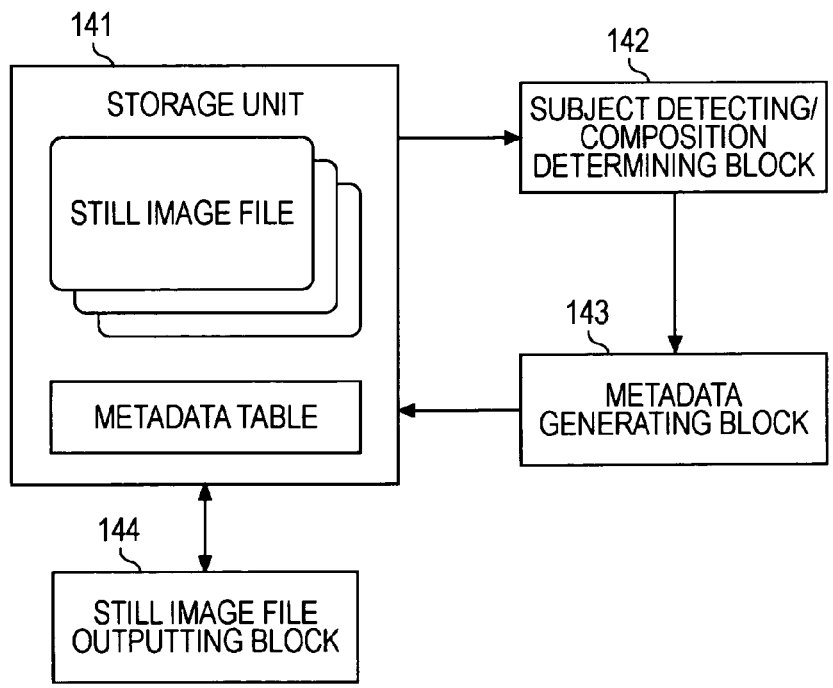
FIG. 26 is a diagram illustrating an application example of composition determination based on the embodiment of the present invention.

The example illustrated in FIG. 26 is preferably applied to an apparatus or system to store many still image files and provide a service using the still image files.

Many still image files are stored in a storage unit 141.

A subject detecting/composition determining block 142 takes in a still image file stored in the storage unit 141 at predetermined timing and extracts still image data stored in the file main body thereof. Then, the subject detecting/composition determining block 142 performs the process same as that performed by the subject detecting/composition determining block 101 illustrated in FIG. 22 on the still image data so as to obtain information indicating a determination result about an optimum composition, and then outputs the information to a metadata generating block 143.

The metadata generating block 143 generates metadata (composition editing metadata) based on the input information, as the metadata generating block 102 illustrated in FIG. 22. Then, in this case, the metadata generating block 143 registers the generated metadata in a metadata table stored in the storage unit 141. The metadata table is an information unit to store metadata such that the correspondence with the still image data stored in the storage unit 141 is indicated. That is, the metadata table indicates the correspondence between metadata (composition editing metadata) and the still image file as a target of a subject detecting process and a composition determining process to generate the metadata performed by the subject detecting/composition determining block 142.

When a still image file stored in the storage unit 141 is to be output in response to a request for the still image file from the outside (in a server, for example, a still image file is downloaded in response to a download request from a client), a still image file outputting block 144 searches the storage unit 141 for the requested still image file and takes in the file, and also searches the metadata table for the metadata (composition editing metadata) corresponding to the searched still image file and takes in the metadata.

The still image file outputting block 144 includes at least functional blocks corresponding to the metadata analyzing block 112 and the trimming block 113 illustrated in FIG. 23.

In the still image file outputting block 144, the metadata analyzing block provided therein analyzes the taken metadata so as to obtain trimming instruction information. Then, the trimming block provided therein performs trimming on the still image data stored in the taken still image file in accordance with the trimming instruction information. Then, the still image file outputting block 144 generates new still image data based on the image portion obtained through the trimming and outputs the new still image data.

The system configuration illustrated in FIG. 26 can be applied to various services.

For example, the system configuration can be applied to a photo print service via a network. Specifically, a user uploads image data (still image file) to be printed to a server of a print service via a network. In the server, the uploaded still image file is stored in the storage unit 141, and metadata corresponding to the file is generated and is registered in the metadata table. Then, at actual print output, the still image file outputting block 144 outputs still image data generated by extracting an optimum composition as image data to be printed. That is, in this service, a printed image in which a composition is corrected to an optimum composition is transmitted in response to a request for photo print.

Also, the system configuration can be applied to a server of a blog or the like. Text data of a blog and uploaded image data are stored in the storage unit 141. Accordingly, an image of an optimum composition can be extracted from the image data uploaded by the user and the extracted image can be pasted on a page of the blog.

The configurations described above with reference to FIGS. 17 to 26 are only examples, and the composition determination according to the embodiment of the present invention can be applied to other apparatuses, systems, and application software.

The description of the embodiment given above is based on the assumption that the subject (individual subject) is a person, but the embodiment of the present invention can also be applied to the case where the subject is not a person, for example, an animal or plant.

Also, image data as a target of subject detection should not be limited to data obtained through imaging (captured image data). For example, image data having image content of paintings or design drawings may be used.

The composition determined based on the embodiment of the present invention (optimum composition) is not necessarily limited to a composition that is decided based on only the rule of thirds. For example, another method such as a composition setting method based on a golden ratio may be adopted. Furthermore, the optimum composition is not limited to a composition that is typically regarded as a good composition based on the rule of thirds or the golden ratio. For example, even a composition that is generally regarded as unfavorable would be evaluated by a user as an interesting or good composition, depending on setting of the composition. Therefore, as the composition determined based on the embodiment of the present invention (optimum composition), a composition may be arbitrarily set in view of practicality and an entertainment characteristic, and there is no particular limit in practice.

It should be understood by those skilled in the art that various modifications, combinations, sub-combinations and alterations may occur depending on design requirements and other factors insofar as they are within the scope of the appended claims or the equivalents thereof.

What is claimed is:

1. A composition determining apparatus comprising:
    subject detecting means for detecting existence of one or more specific subjects in an image based on image data; and
    composition determining means for determining a composition in accordance with the number of subjects detected by the subject detecting means,
    wherein the composition determining means changes a composition determining manner in accordance with the number of the detected subjects, and
    wherein, when the number of the detected subjects is two or more, the composition determining means sets a different value as a ratio of a distance between the subjects positioned at right and left ends to a length of the image in a horizontal direction, in accordance with the number of the detected subjects.

2. A composition determining apparatus comprising:
subject detecting means for detecting existence of one or more specific subjects in an image based on image data; and
composition determining means for determining a composition in accordance with the number of subjects detected by the subject detecting means,
wherein the composition determining means changes a composition determining manner in accordance with the number of the detected subjects, and
wherein the composition determining means determines an orientation of the image, which is rectangular, to be any of vertical and horizontal in accordance with the number of the detected subjects.

3. The composition determining apparatus according to claim 2,
wherein, when the number of the detected subjects is equal to or larger than a predetermined value, the composition determining means determines the orientation of the rectangular image to be any of vertical and horizontal based on a distance between the subjects positioned at right and left ends.

4. The composition determining apparatus according to claim 3,
wherein, when the number of the detected subjects is equal to or larger than the predetermined value and when the number is a predetermined value of two or more, the composition determining means determines the orientation of the rectangular image to be any of vertical and horizontal based on the distance between the subjects positioned at the right and left ends.

5. The composition determining apparatus according to claim 2,
wherein, when the number of the detected subjects is equal to or larger than a predetermined value, the composition determining means determines the orientation of the rectangular image to be any of vertical and horizontal based on a distance between the subjects positioned at right and left ends and a distance between the subjects positioned at upper and lower ends.

6. The composition determining apparatus according to claim 5,
wherein, when the number of the detected subjects is equal to or larger than the predetermined value and when the number is a predetermined value of two or more, the composition determining means determines the orientation of the rectangular image to be any of vertical and horizontal based on the distance between the subjects positioned at the right and left ends and the distance between the subjects positioned at the upper and lower ends.

7. A composition determining method comprising the steps of:
detecting, by use of a subject detecting unit, existence of one or more specific subjects in an image based on image data; and
determining a composition in accordance with the number of subjects detected in the subject detecting step,
wherein the determining step changes a composition determining manner in accordance with the number of the detected subjects, and
wherein, when the number of the detected subjects is two or more, the determining step sets a different value as a ratio of a distance between the subjects positioned at right and left ends to a length of the image in a horizontal direction, in accordance with the number of the detected subjects.

8. A non-transitory computer-readable medium having stored thereon a program allowing a composition determining apparatus to perform:
detecting existence of one or more specific subjects in an image based on image data; and
determining a composition in accordance with the number of subjects detected in the subject detecting step,
wherein the determining step changes a composition determining manner in accordance with the number of the detected subjects, and
wherein, when the number of the detected subjects is two or more, the determining step sets a different value as a ratio of a distance between the subjects positioned at right and left ends to a length of the image in a horizontal direction, in accordance with the number of the detected subjects.

9. A composition determining apparatus comprising:
a subject detecting unit configured to detect existence of one or more specific subjects in an image based on image data; and
a composition determining unit configured to determine a composition in accordance with the number of subjects detected by the subject detecting unit,
wherein the composition determining unit changes a composition determining manner in accordance with the number of the detected subjects, and
wherein, when the number of the detected subjects is two or more, the composition determining unit sets a different value as a ratio of a distance between the subjects positioned at right and left ends to a length of the image in a horizontal direction, in accordance with the number of the detected subjects.

* * * * *